(12) United States Patent
Akhbari et al.

(10) Patent No.: US 11,719,671 B2
(45) Date of Patent: Aug. 8, 2023

(54) METHODS OF DISTINGUISHING AMONG TOUCH EVENTS

(71) Applicant: UltraSense Systems, Inc., San Jose, CA (US)

(72) Inventors: Sina Akhbari, San Jose, CA (US); Zhongxuan Tu, Shanghai (CN); Michael Chen, Sunnyvale, CA (US); Hao-Yen Tang, San Jose, CA (US)

(73) Assignee: UltraSense Systems, Inc., San Jose, CA (US)

( * ) Notice: Subject to any disclaimer, the term of this patent is extended or adjusted under 35 U.S.C. 154(b) by 88 days.

(21) Appl. No.: 17/504,758

(22) Filed: Oct. 19, 2021

(65) Prior Publication Data

US 2022/0128516 A1     Apr. 28, 2022

Related U.S. Application Data

(60) Provisional application No. 63/105,842, filed on Oct. 26, 2020.

(51) Int. Cl.
| | | |
|---|---|---|
| *G01N 29/24* | (2006.01) | |
| *G01L 1/16* | (2006.01) | |
| *G01L 1/14* | (2006.01) | |
| *G01N 29/44* | (2006.01) | |

(52) U.S. Cl.
CPC .......... *G01N 29/2437* (2013.01); *G01L 1/142* (2013.01); *G01L 1/16* (2013.01); *G01N 29/44* (2013.01); *G01N 2291/102* (2013.01)

(58) Field of Classification Search
CPC ............. G01N 2291/102; G01N 29/44; G01N 29/2437; G01N 29/24; G01L 1/16; G06F 3/04186
See application file for complete search history.

(56) References Cited

U.S. PATENT DOCUMENTS

| | | | |
|---|---|---|---|
| 4,412,544 A | 11/1983 | Beretsky et al. | |
| 8,676,540 B1 | 3/2014 | Welch et al. | |
| 9,454,954 B2 * | 9/2016 | Hajati | .............. G10K 11/343 |
| 10,001,552 B2 * | 6/2018 | Panchawagh | ........ G10K 11/346 |
| 10,296,145 B2 * | 5/2019 | Medina | ................ G06F 3/0436 |
| 10,466,844 B1 | 10/2019 | Tang et al. | |

(Continued)

FOREIGN PATENT DOCUMENTS

WO     WO2018077761     5/2018

*Primary Examiner* — Tran M. Tran
(74) *Attorney, Agent, or Firm* — Perkins Coie LLP

(57) ABSTRACT

A method of distinguishing between a first-type touch event and a second-type touch event is disclosed. A force-measuring and touch-sensing system includes piezoelectric force-measuring elements (PFEs) and piezoelectric ultrasonic transducers (PUTs), wherein each PUT can be configured as a transmitter (PUT transmitter) and/or a receiver (PUT receiver). The force-measuring and touch-sensing system is configured at a sense region. Each PUT transmitter transmits ultrasound signals towards the sense region and voltage signals are generated at the PUT receivers in response to ultrasound signals arriving from the sense region. Voltage signals are generated at PFEs in response to a low-frequency mechanical deformation of the respective piezoelectric capacitors. An event is determined to be a first-type touch event or a second-type touch event depending on a PUT data decrease and a magnitude of PFE data.

61 Claims, 23 Drawing Sheets

(56) References Cited

U.S. PATENT DOCUMENTS

| | | | |
|---|---|---|---|
| 10,497,748 B2* | 12/2019 | Panchawagh | G06F 3/0436 |
| 10,562,070 B2* | 2/2020 | Garlepp | B06B 1/0629 |
| 10,564,778 B2* | 2/2020 | Medina | G06V 40/1306 |
| 10,585,534 B2 | 3/2020 | Tang et al. | |
| 10,670,716 B2* | 6/2020 | Apte | G10K 11/346 |
| 10,719,175 B2 | 7/2020 | Akhbari et al. | |
| 10,755,067 B2* | 8/2020 | De Foras | G06V 40/1359 |
| 10,775,938 B2 | 9/2020 | Tang et al. | |
| 10,860,831 B2* | 12/2020 | Garlepp | G06V 40/1306 |
| 10,984,209 B2* | 4/2021 | Akhbari | G06T 5/50 |
| 11,087,109 B1* | 8/2021 | Strohmann | G06V 40/1394 |
| 11,107,858 B2* | 8/2021 | Berger | H10N 30/1071 |
| 11,154,906 B2* | 10/2021 | Garlepp | B06B 1/0629 |
| 11,176,345 B2* | 11/2021 | Chau | G06V 40/1365 |
| 11,216,681 B2* | 1/2022 | Akhbari | G06V 40/1388 |
| 11,238,258 B2* | 2/2022 | Lu | G06V 40/1306 |
| 11,263,424 B2* | 3/2022 | Tsai | B81C 1/00301 |
| 11,288,891 B2* | 3/2022 | Salvia | G06V 40/1347 |
| 11,328,165 B2* | 5/2022 | Hall | G06F 21/32 |
| 11,366,543 B2* | 6/2022 | Sammoura | G06V 40/1306 |
| 11,481,062 B1* | 10/2022 | Wright | G06F 3/0414 |
| 11,500,494 B2* | 11/2022 | Akhbari | G06N 3/08 |
| 2001/0000666 A1 | 5/2001 | Wood et al. | |
| 2002/0005108 A1 | 1/2002 | Ludwig | |
| 2003/0144814 A1 | 7/2003 | Hama et al. | |
| 2003/0217873 A1 | 11/2003 | Paradiso et al. | |
| 2003/0233233 A1 | 12/2003 | Hong | |
| 2007/0260425 A1 | 11/2007 | Kim | |
| 2008/0316184 A1 | 12/2008 | D'Souza | |
| 2009/0157206 A1 | 6/2009 | Weinberg et al. | |
| 2009/0224161 A1 | 9/2009 | Fritsch et al. | |
| 2010/0117993 A1 | 5/2010 | Kent | |
| 2010/0139991 A1 | 6/2010 | Phillip et al. | |
| 2010/0258361 A1 | 10/2010 | Yamauchi et al. | |
| 2011/0061464 A1 | 3/2011 | Yi-min | |
| 2012/0274609 A1 | 11/2012 | Sheng et al. | |
| 2013/0345864 A1 | 12/2013 | Park et al. | |
| 2014/0022189 A1 | 1/2014 | Sheng et al. | |
| 2014/0071095 A1 | 3/2014 | Godsill | |
| 2015/0148674 A1 | 5/2015 | Park et al. | |
| 2015/0169136 A1 | 6/2015 | Ganti et al. | |
| 2016/0107194 A1* | 4/2016 | Panchawagh | G10K 11/34 310/317 |
| 2016/0216794 A1 | 7/2016 | Yoon et al. | |
| 2016/0246449 A1 | 8/2016 | Jarske | |
| 2017/0110504 A1 | 4/2017 | Panchawagh et al. | |
| 2017/0255338 A1 | 9/2017 | Medina | |
| 2017/0322290 A1 | 11/2017 | Ng et al. | |
| 2017/0323133 A1* | 11/2017 | Tsai | B06B 1/06 |
| 2017/0336903 A1 | 11/2017 | Rivaud et al. | |
| 2017/0336926 A1 | 11/2017 | Chaudhri et al. | |
| 2018/0032161 A1 | 2/2018 | Shi et al. | |
| 2018/0032211 A1 | 2/2018 | King | |
| 2018/0039392 A1 | 2/2018 | Kim et al. | |
| 2018/0164937 A1 | 6/2018 | Lynn | |
| 2018/0246612 A1 | 8/2018 | Lynn et al. | |
| 2018/0276439 A1 | 9/2018 | Strohmann et al. | |
| 2018/0276440 A1 | 9/2018 | Strohmann et al. | |
| 2018/0284892 A1 | 10/2018 | Kwon et al. | |
| 2018/0323783 A1 | 11/2018 | Bang et al. | |
| 2019/0050618 A1 | 2/2019 | Khuri-Yakub | |
| 2019/0074833 A1 | 3/2019 | Sheng | |
| 2019/0354209 A1 | 11/2019 | Tang et al. | |
| 2019/0354210 A1 | 11/2019 | Akhbari et al. | |
| 2019/0354237 A1 | 11/2019 | Tang et al. | |
| 2019/0354238 A1 | 11/2019 | Akhbari et al. | |
| 2020/0243086 A1* | 7/2020 | Chen | G05B 15/02 |
| 2020/0357379 A1* | 11/2020 | Garlepp | G10K 11/345 |
| 2020/0367858 A1* | 11/2020 | Baldasarre | G01S 7/52079 |
| 2020/0400800 A1* | 12/2020 | Ng | H10N 30/2047 |
| 2021/0124892 A1* | 4/2021 | De Foras | G06V 40/1382 |
| 2021/0181041 A1 | 6/2021 | Tang | |
| 2021/0239553 A1 | 8/2021 | Akhbari et al. | |
| 2021/0242393 A1 | 8/2021 | Tang | |
| 2021/0278926 A1 | 9/2021 | Akhbari et al. | |
| 2021/0293641 A1 | 9/2021 | Tu et al. | |
| 2021/0293648 A1 | 9/2021 | Tu et al. | |
| 2021/0396718 A1* | 12/2021 | Garlepp | H10N 30/87 |
| 2021/0397290 A1* | 12/2021 | Medina | G06V 40/1306 |
| 2022/0169497 A1* | 6/2022 | Savoia | B06B 1/0292 |
| 2022/0390310 A1* | 12/2022 | Wu | G01L 19/0618 |

\* cited by examiner

METHODS OF DISTINGUISHING AMONG TOUCH EVENTS

CROSS-REFERENCE TO RELATED APPLICATION(S)

This application claims the benefit of U.S. Provisional Patent Application No. 63/105,842 filed on Oct. 26, 2020, entitled METHODS OF DISTINGUISHING AMONG TOUCH EVENTS, which is incorporated herein by reference in its entirety.

BACKGROUND

Recent progress in integration of micro-electro-mechanical systems (MEMS) fabrication technologies with complementary metal-oxide-semiconductor (CMOS) semiconductor processing have enabled the fabrication of integrated circuits (ICs) containing piezoelectric micromechanical ultrasonic transducers (PMUTs) and piezoelectric micromechanical force-measuring elements (PMFEs). The resulting IC can be configured to have touch-sensing and force-measuring capabilities. It would be desirable to realize methods of distinguishing among various touch events using these touch-sensing and force-measuring capabilities.

SUMMARY OF THE INVENTION

In one aspect, a force-measuring and touch-sensing system includes piezoelectric force-measuring elements (PFEs) and piezoelectric ultrasonic transducers (PUTs), wherein each PUT can be configured as a transmitter (PUT transmitter) and/or a receiver (PUT receiver). Each PUT or PFE includes a piezoelectric capacitor. In accordance with each of the disclosed methods, the force-measuring and touch-sensing system is configured at a sense region. Each PUT transmitter transmits ultrasound signals towards the sense region, and a signal processing circuitry reads voltage signals from the PUT receivers generated in response to ultrasound signals arriving at the PUT receivers from the sense region. The signal processing circuitry reads voltage signals from the PFEs generated in response to a low-frequency mechanical deformation of the respective piezoelectric capacitor. The PUT voltage signals are processed to obtain PUT digital data and the PFE voltage signals are processed to obtain PFE digital data.

In another aspect, piezoelectric force-measuring elements (PFEs) can be piezoelectric micromechanical force-measuring elements (PMFEs) and piezoelectric ultrasonic transducers (PUTs) can be piezoelectric micromechanical ultrasonic transducers (PMUTs).

In yet another aspect, a method of distinguishing between a first-type touch event and a second-type touch event at the sense region is disclosed. The method includes determining that an event is the first-type touch event if the PUT digital data decrease by at least a minimum decrease percentage and a magnitude of the PFE digital data is greater than a PFE noise threshold value. The method includes determining that the event is a second-type touch event if the PUT digital data decrease by at least the minimum decrease percentage and the magnitude of the PFE digital data is not greater than a PFE noise threshold value. A first-type touch event may be a digit touching the sense region and a second-type touch event may be a liquid droplet landing on the sense region.

In yet another aspect, a method of distinguishing between an actual-touch event and a non-touch event at a sense region is disclosed. The method includes determining that an event is an actual-touch event if the PUT digital data decrease by at least a minimum decrease percentage and a magnitude of the PFE digital data is greater than a PFE noise threshold value. The method includes determining that the event is a non-touch event if the PUT digital data do not decrease by at least the minimum decrease percentage, or the magnitude of the PFE digital data is not greater than the PFE noise threshold value.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION OF ILLUSTRATIVE EMBODIMENTS

The present disclosure relates to methods of distinguishing among different touch events, determining whether an event is a repetitive-touch event, determining a material constituting an object contacting a sense region, estimating an applied force during an event, and determining whether an event at a sense region is within a predetermined range of force.

In this Disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

Figure 1:
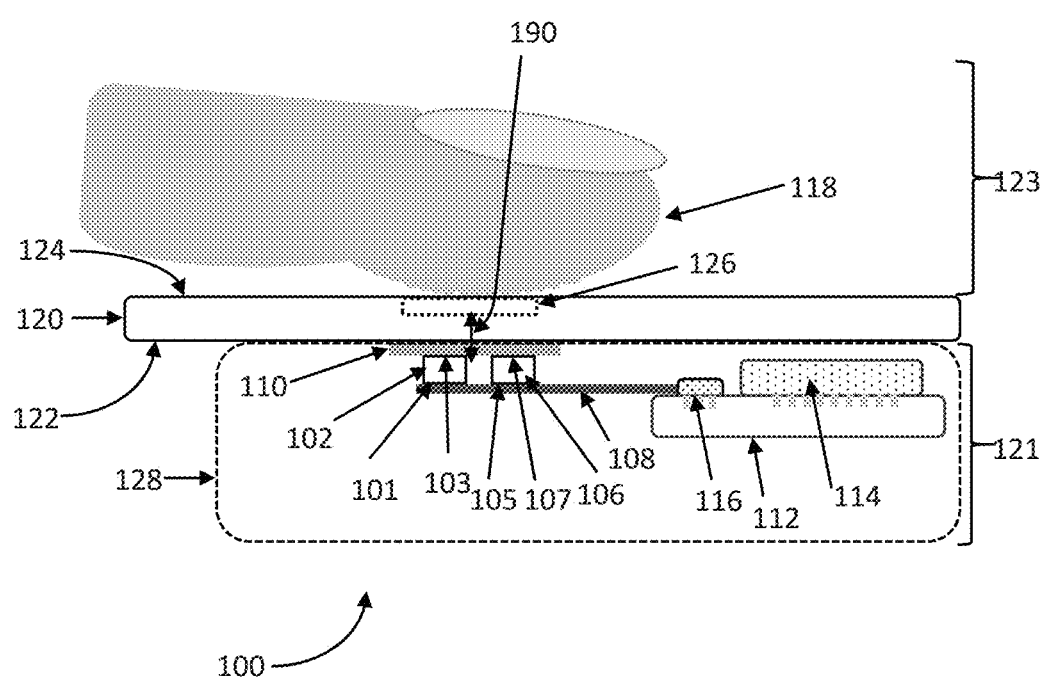
FIG. 1 is a schematic view of an illustrative input system including two force-measuring and touch-sensing integrated circuits (FMTSICs), laid side-by-side.

FIG. 1 is a schematic view of an input system 100. In the example shown, system 100 includes force-measuring and touch-sensing integrated circuits (FMTSICs) 102, 106. In other examples, it is possible for a system to have a single force-measuring and touch-sensing integrated circuit or more than two integrated circuits. Each of the FMTSIC devices 102, 106 has an electrical interconnection surface (bottom surface) 101, 105 and an ultrasound transmission surface (top surface) 103, 107. In the example shown, each FMTSIC device 102, 106 is in the form of a semiconductor die in a package. The FMTSICs are mounted to a flexible circuit substrate 108 (e.g., an FPC or flexible printed circuit) on the electrical interconnection surfaces 101, 105. The flexible circuit substrate 108 is electrically and mechanically connected to a printed circuit board (PCB) 112 via a connector 116. Other ICs 114 are mounted on the PCB 112, and such other ICs 114 could be a microcontroller (MCU), microprocessor (MPU), and/or a digital signal processor (DSP), for example. These other ICs 114 could be used to run programs and algorithms to analyze and categorize touch events based on data received from the FMTSICs 102, 106.

System 100 includes a cover layer 120 having an exposed outer surface 124 and an inner surface 122. The cover layer 120 could be of any robust layer(s) that transmits ultrasound waves, such as wood, glass, metal, plastic, leather, fabric, and ceramic. The cover layer 120 could also be a composite stack and could be a composite stack of any of the foregoing materials. The FMTSICs 102, 106 are adhered to the inner surface 122 of the cover layer 120 by a layer of adhesive 110. The choice of adhesive 110 is not particularly limited as long as the FMTSIC remains attached to the cover layer. The adhesive 110 could be double-sided tape, pressure sensitive adhesive (PSA), epoxy adhesive, or acrylic adhesive, for example. FMTSICs 102, 106 are coupled to the inner surface 122. In operation, the FMTSICs 102, 106 generate ultrasound waves in longitudinal modes that propagate along a normal direction 190, shown in FIG. 1 as being approximately normal to the exposed outer surface 124 and the inner surface 122 of the cover layer. Stated more precisely, the normal direction 190 is normal to a piezoelectric layer. Since the piezoelectric layer defines a plane of a piezoelectric capacitor, the normal direction 190 is approximately normal to a plane of the piezoelectric capacitor. The generated ultrasound waves exit the FMTSICs 102, 106 and travel through the respective ultrasound transmission surfaces 103, 107, through the adhesive layer 110, then through the inner surface 122, and then through the cover layer 120. The ultrasound waves reach a sense region 126 of the exposed outer surface 124. The sense region 126 is a region of the exposed outer surface 124 that overlaps the FMTSICs 102, 106.

FIG. 1 illustrates a use case in which a human finger 118 is touching the cover layer at the sense region 126. If there is no object touching the sense region 126, the ultrasound waves that have propagated through the cover layer 120 are reflected at the exposed outer surface (at the air-material interface) and the remaining echo ultrasonic waves travel back toward the FMTSICs 102, 106. On the other hand, if there is a finger 118 touching the sense region, there is relatively large attenuation of the ultrasound waves by absorption through the finger. As a result, it is possible to detect a touch event by measuring the relative intensity or energy of the echo ultrasound waves that reach the FMTSICs 102, 106.

It is possible to distinguish between a finger touching the sense region 126 and a water droplet landing on the sense region 126, for example. When a finger touches the sense region 126, the finger would also exert a force on the cover layer 120. The force exerted by the finger on the cover layer can be detected and measured using the PMFEs in the FMTSIC. On the other hand, it is unlikely that a water droplet landing on the sense region would exert force greater than a noise threshold. More generally, it is possible to distinguish between a digit that touches and presses the sense region 126 and an inanimate object that comes into contact with the sense region 126.

System 100 can be implemented in numerous apparatuses. For example, the FMTSICs can replace conventional buttons on Smartphones, keys on computer keyboards, sliders, or track pads. The interior contents 128 of an apparatus (e.g., FMTSICs 102, 106, flexible circuit substrate 108, connector 116, PCB 112, other ICs 114) can be sealed off from the exterior 123 of the cover layer 120, so that liquids on the exterior 123 cannot penetrate into the interior 121 of the apparatus. The ability to seal the interior of an apparatus from the outside helps to make the apparatus, such as a Smartphone or laptop computer, waterproof. There are some applications, such as medical applications, where waterproof buttons and keyboards are strongly desired. The apparatus can be a mobile appliance (e.g., Smartphone, tablet computer, laptop computer), a household appliance (e.g., washing machine, dryer, light switches, air conditioner, refrigerator, oven, remote controller devices), a medical appliance, an industrial appliance, an office appliance, an automobile, or an airplane.

Figure 2:
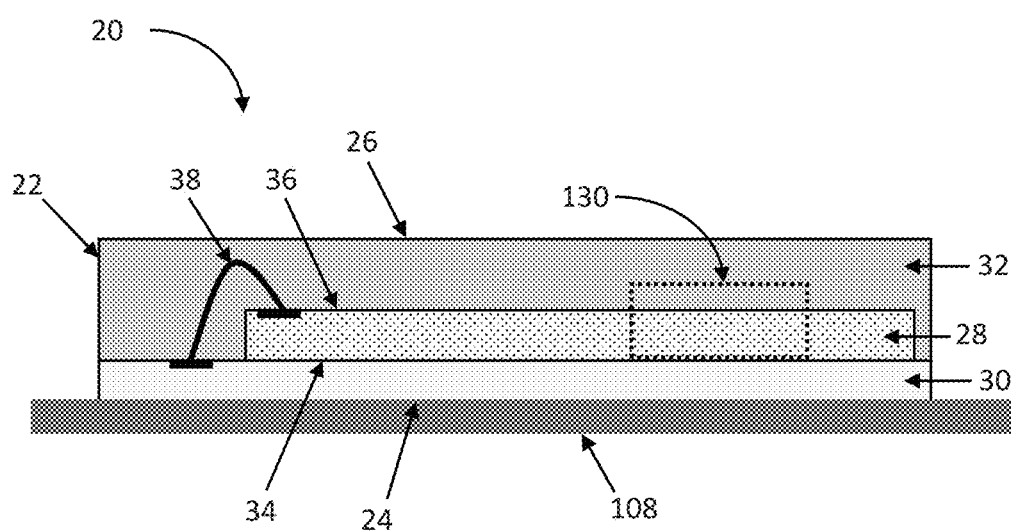
FIG. 2 is a schematic cross-sectional view of a force-measuring and touch-sensing integrated circuits (FMTSICs).

The force-measuring, touch-sensing integrated circuit (FMTSIC) is shown in greater detail in FIG. 2. FIG. 2 is a cross-sectional view the FMTSIC device 20, which is analogous to FMTSIC 102, 106 in FIG. 1. FMTSIC 20 is shown encased in a package 22, with an ultrasound transmission surface (top surface) 26 and electrical interconnection surface (bottom surface) 24. Ultrasound transmission surface 26 is analogous to surfaces 103, 107 in FIG. 1 and electrical interconnection surface 24 is analogous to surfaces 101, 105 in FIG. 1. The FMTSIC 20 includes a package substrate 30, semiconductor portion (chip) 28 mounted to the package substrate 30, and an encapsulating adhesive 32, such as an epoxy adhesive. After the semiconductor die 28 is mounted to the package substrate 30, wire bond connections 38 are formed between the die 28 and the package substrate 30. Then the entire assembly including the die 28 and the package substrate 30 are molded (encapsulated) in an epoxy adhesive 32. The epoxy side (top surface or ultrasound transmission surface 26) of the FMTSIC device is adhered to the inner surface 122 of the cover layer 120. The FMTSIC 20 is shown mounted to the flexible circuit 108. It is preferable that the FMTSIC device have lateral dimensions no greater than 10 mm by 10 mm. The wire bond connection is formed between the top surface 36 of the semiconductor die 28 and the package substrate 30. Alternatively, electrical interconnections can be formed between the bottom surface 34 of the semiconductor die 28 and the package substrate. The semiconductor die 28 consists of an application-specific integrated circuit (ASIC) portion and a micro-electro-mechanical systems (MEMS) portion. A selected portion 130 of the semiconductor die 28 is shown in cross-section in FIG. 3.

Figure 3:
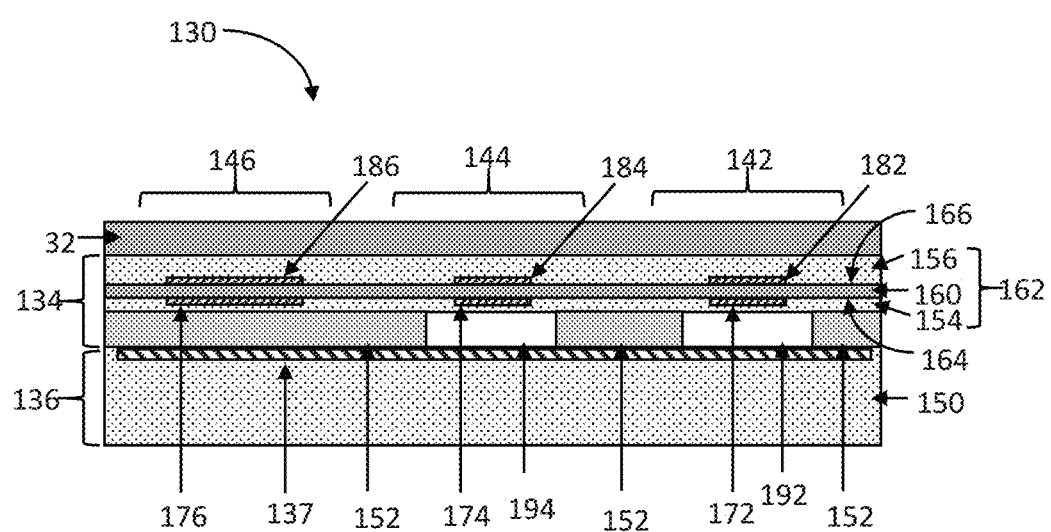
FIG. 3 is a schematic cross-sectional view of a certain portion of the force-measuring and touch-sensing integrated circuits (FMTSICs) of FIG. 2.

FIG. 3 is a schematic cross-sectional view of a portion 130 of the force-measuring, touch-sensing integrated circuit of FIG. 2. The semiconductor die 28 includes a MEMS portion 134 and an ASIC portion 136. Between the ASIC portion 136 and the MEMS portion 134, the MEMS portion 134 is closer to the ultrasound transmission surface 26 and the ASIC portion 136 is closer to the electrical interconnection surface 24. The ASIC portion 136 consists of a semiconductor substrate 150 and signal processing circuitry 137 thereon. Typically, the semiconductor substrate is a silicon substrate, but other semiconductor substrates such as silicon-on-insulator (SOI) substrates can also be used.

The MEMS portion 134 includes a PMUT transmitter 142, a PMUT receiver 144, and a PMFE 146. The MEMS portion 134 includes a thin-film piezoelectric stack 162 overlying the semiconductor substrate 150. The thin-film piezoelectric stack 162 includes a piezoelectric layer 160, which is a layer exhibiting the piezoelectric effect. Suitable materials for the piezoelectric layer 160 are aluminum nitride, scandium-doped aluminum nitride, polyvinylidene fluoride (PVDF), lead zirconate titanate (PZT), $K_xNa_{1-x}NbO_3$ (KNN), quartz, zinc oxide, and lithium niobate, for example. For example, the piezoelectric layer is a layer of aluminum nitride having a thickness of approximately 1 μm. The piezoelectric layer 160 has a top major surface 166 and a bottom major surface 164 opposite the top major surface 166. In the example shown, the thin-film piezoelectric stack 162 additionally includes a top mechanical layer 156, attached to or adjacent to (coupled to) top major surface 166, and a bottom mechanical layer 154, attached to or adjacent to (coupled to) bottom major surface 164. In the example shown, the thickness of the top mechanical layer 156 is greater than the thickness of the bottom mechanical layer 154. In other examples, the thickness of the top mechanical layer 156 can be smaller than the thickness of the bottom mechanical layer 154. Suitable materials for the mechanical layer(s) are silicon, silicon oxide, silicon nitride, and aluminum nitride, for example. Suitable materials for the mechanical layer(s) can also be a material that is included in the piezoelectric layer 160, which in this case is aluminum nitride. In the example shown, the top mechanical layer and the bottom mechanical layer contain the same material. In other examples, the top mechanical layer and the bottom mechanical layer are of different materials. In other examples, one of the top mechanical layer and the bottom mechanical layer can be omitted. When coupled to the cover layer, the FMTSIC 20 is preferably oriented such that the piezoelectric layer 160 faces toward the cover layer 120. For example, the FMTSIC 20 is oriented such that the piezoelectric layer 160 and the cover layer 120 are approximately parallel.

For ease of discussion, only one of each of the PMUT transmitters, PMUT receivers, and PMFEs is shown in FIG. 3. However, a typical FMTSIC can contain a plurality of PMUT transmitters, PMUT receivers, and PMFEs. The PMUT transmitters, the PMUT receivers, and the PMFEs are located along respective lateral positions along the thin-film piezoelectric stack 162. Each PMUT transmitter, PMUT receiver, and PMFE includes a respective portion of the thin-film piezoelectric stack.

Each of the PMUTs is configured as a transmitter (142) or a receiver (144). Each PMUT (142, 144) includes a cavity (192, 194) and a respective portion of the thin-film piezoelectric stack 162 overlying the cavity (192, 194). The cavities are laterally bounded by an anchor layer 152 which supports the thin-film piezoelectric stack. Suitable materials for the anchor layer 152 are silicon, silicon nitride, and silicon oxide, for example. Suitable materials for the anchor layer 152 can also be a material that is included in the piezoelectric layer 160, which in this case is aluminum nitride. Each PMUT (142, 144) includes a first PMUT electrode (172, 174) positioned on a first side (bottom surface) 164 of the piezoelectric layer 160 and a second PMUT electrode (182, 184) positioned on a second side (top surface) 166 opposite the first side. In each PMUT (142, 144), the first PMUT electrode (172, 174), the second PMUT electrode (182, 184), and the piezoelectric layer 160 between them constitute a piezoelectric capacitor. The first PMUT electrodes (172, 174) and the second PMUT electrodes (182, 184) are coupled to the signal processing circuitry 137. The cavities (172, 174) are positioned between the thin-film piezoelectric stack 162 and the semiconductor substrate 150. In the example shown, the FMTSIC 20 is in the form of an encapsulated package 22. The cavities 192, 194 are preferably under low pressure (pressure lower than atmospheric pressure or in vacuum) and remain so because of the package 22.

Each PMFE 146 includes a respective portion of the thin-film piezoelectric stack 162. Each PMFE 146 includes a first PMFE electrode 176 positioned on a first side (bottom surface) 164 of the piezoelectric layer 160 and a second PMFE electrode 186 positioned on a second side (top surface) 166 opposite the first side. In each PMFE 146, the first PMFE electrode 176, the second PMFE electrode 186, and the piezoelectric layer 160 between them constitute a piezoelectric capacitor. The PMFEs are coupled to the signal processing circuitry 137. In the example shown, the PMFE is not overlying any cavity.

Figure 4:
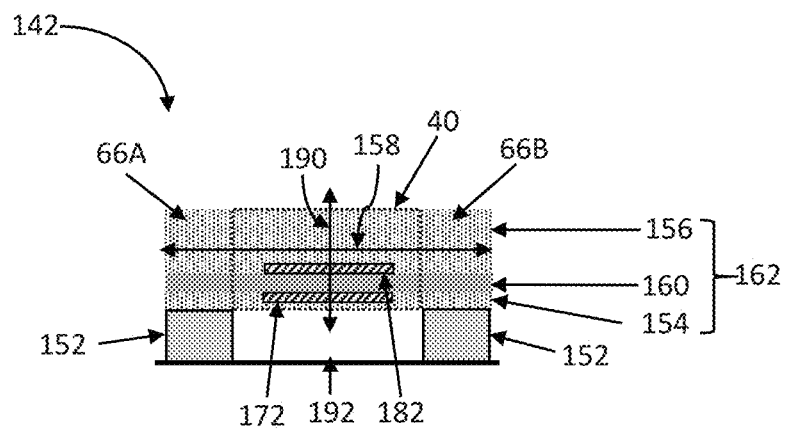
FIGS. 4, 5, and 6 are schematic cross-sectional views of a PMUT transmitter.
Figure 5:
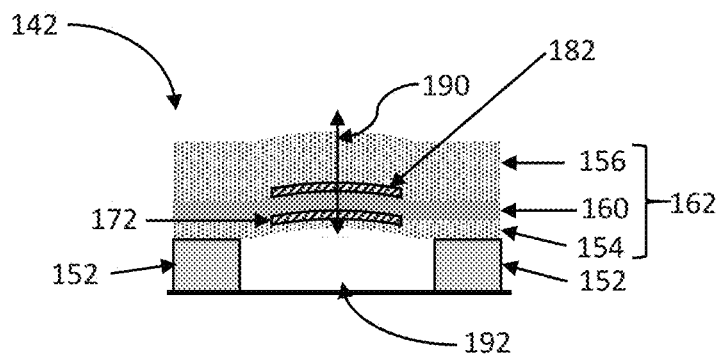

The PMUT transmitter 142 is shown in cross section in FIG. 4. In the example shown, the thickness of the top mechanical layer 156 is greater than the thickness of the bottom mechanical layer 154, and the top mechanical layer 156 and the bottom mechanical layer contain the same material, aluminum nitride. In this case, the neutral axis 158 is positioned within the top mechanical layer 156. The neutral axis is the axis in the beam (in this case, the beam is the piezoelectric stack 162) along which there are no normal stresses or strains during bending. FIG. 4 shows the PMUT transmitter in a quiescent state, in which there is no voltage applied between the first PMUT electrode 172 and the second PMUT electrode 182. The piezoelectric layer 160 has a built-in polarization (piezoelectric polarization) that is approximately parallel to normal direction 190. Normal direction 190 is normal to the piezoelectric layer 160. Normal direction 190 is approximately normal to a plane of the respective piezoelectric capacitor. FIG. 5 shows the PMUT transmitter in a first state, in which there is a first transmitter voltage $V_{Tx1}$ (corresponding to a certain polarity and magnitude) applied between the electrodes (172, 182). As a result, the portion of the piezoelectric stack 162 overlying the cavity 192 flexes upward (away from the cavity 192). In a middle region in between the inflection points of the piezoelectric stack, there is compressive (negative) strain in portions of the piezoelectric stack 162 below the neutral axis 158, including the piezoelectric layer 160, and tensile (positive) strain in portions of the piezoelectric stack 162 above the neutral axis 158.

Figure 6:
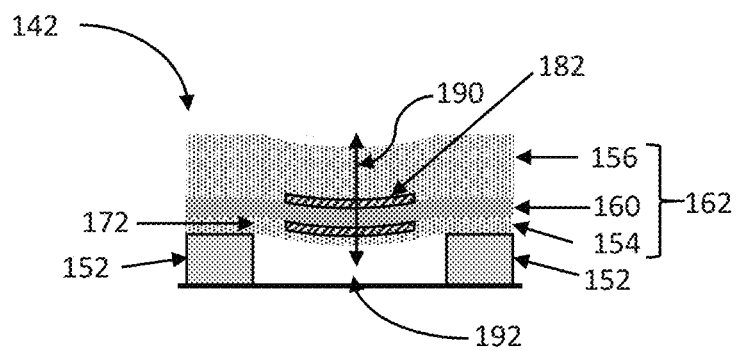

FIG. 6 shows the PMUT transmitter in a second transmitter state, in which there is a second transmitter voltage $V_{Tx2}$ (corresponding to a certain polarity and magnitude) applied between the PMUT electrodes (172, 182). In a middle region in between the inflection points of the piezoelectric stack, there is tensile (positive) strain in portions of the piezoelectric stack 162 below the neutral axis 158, including the piezoelectric layer 160, and compressive (negative) strain in portions of the piezoelectric stack 162 above the neutral axis 158. As a result, the portion of the piezoelectric stack 162 overlying the cavity 192 flexes downward (toward the cavity 192). The signal processing circuitry 137 is operated to generate and apply a time-varying voltage signal $V_{Tx}(t)$ between the PMUT electrodes (172, 182) of the PMUT transmitter 142. If the time-varying voltage signal oscillates between the first voltage and the second voltage at a certain frequency, the piezoelectric stack 162 oscillates between the first state and the second state. As a result, the PMUT transmitter generates (transmits), upon application of the time-varying voltage signal, ultrasound signals propagating along the normal direction 190. Because of the presence of the cavity 192 at a low pressure, a relatively small fraction of the generated ultrasound energy is transmitted downward toward the cavity 192, and a relatively large fraction of the generated ultrasound energy is transmitted upward away from the cavity 192. The PMUT transmitters are configured to transmit ultrasound signals of a frequency in a range of 0.1 MHz to 25 MHz.

Figure 7:
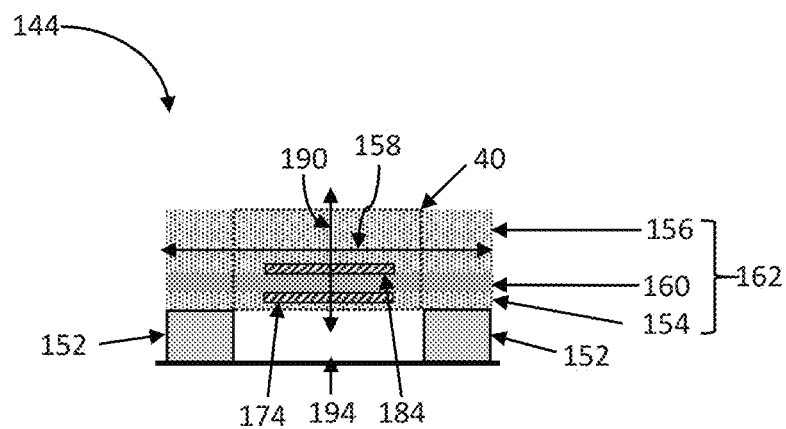
FIGS. 7, 8, and 9 are schematic cross-sectional views of a PMUT receiver.
Figure 8:
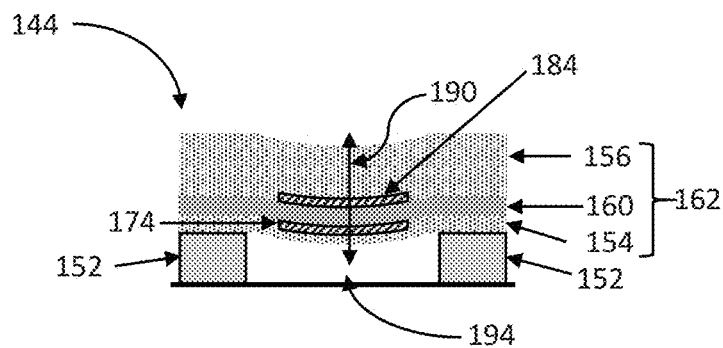

The PMUT receiver 144 is shown in cross section in FIG. 7. FIG. 7 shows the PMUT receiver in a quiescent state, in which there is no flexing of the piezoelectric stack 162 away from or towards the cavity 194. In the quiescent state, there is no voltage generated between the PMUT electrodes (174, 184). FIG. 8 shows the PMUT receiver in a first receiver state, in which a positive ultrasound pressure wave is incident on the PMUT receiver, along the normal direction 190, to cause the piezoelectric stack 162 to flex downwards (towards the cavity 194). In a middle region in between the inflection points of the piezoelectric stack, there is tensile (positive) strain in portions of the piezoelectric stack 162 below the neutral axis 158, including the piezoelectric layer 160, and compressive (negative) strain in portions of the piezoelectric stack 162 above the neutral axis 158. As a result, a first receiver voltage $V_{Rx1}$ (corresponding to a certain polarity and magnitude) is generated between the PMUT electrodes (174, 184).

Figure 9:
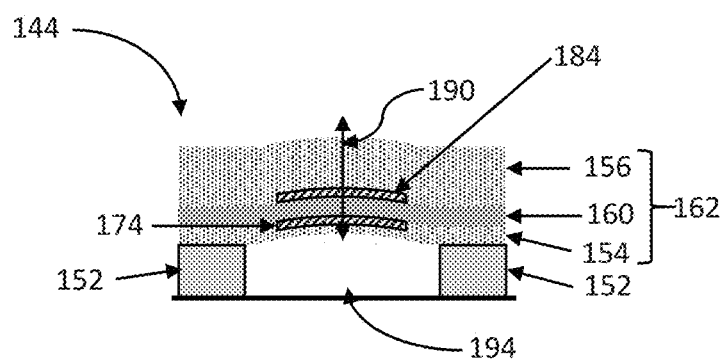

FIG. 9 shows the PMUT receiver in a second receiver state, in which a negative ultrasound pressure wave is incident on the PMUT receiver, along the normal direction 190, to cause the portion of the piezoelectric stack 162 overlying the cavity 194 to flex upwards (away from the cavity 194). In a middle region in between the inflection points of the piezoelectric stack, there is compressive (negative) strain in portions of the piezoelectric stack 162 below the neutral axis 158, including the piezoelectric layer 160, and tensile (positive) strain in portions of the piezoelectric stack 162 above the neutral axis 158. As a result, a second receiver voltage $V_{Rx2}$ (corresponding to a certain polarity and magnitude) is generated between the PMUT electrodes (174, 184). If ultrasound signals are incident on the PMUT receiver 144 along the normal direction 190 causing the piezoelectric stack 162 to oscillate between the first receiver state and the second receiver state, a time-varying voltage signal $V_{Rx}(t)$ oscillating between the first receiver voltage and the second receiver voltage is generated between the PMUT electrodes (174, 184). The time-varying voltage signal is amplified and processed by the signal processing circuitry 137.

In operation, the PMUT transmitter 142 is configured to transmit, upon application of voltage signals between the PMUT transmitter electrodes (172, 182), ultrasound signals of a first frequency $F_1$ in longitudinal mode(s) propagating along a normal direction 190 approximately normal to the piezoelectric layer 160 away from the cavity 192 towards the sense region 126. The ultrasound signals propagate towards the sense region 126 of the cover layer 120 to which FMTSIC 20 is coupled. Upon application of the voltage signals, the respective portion of the piezoelectric stack overlying the cavity 192 (of the PMUT transmitter 142) oscillates with a first frequency $F_1$ between a first transmitter state and a second transmitter state to generate ultrasound signals of the first frequency $F_1$. The PMUT receiver 144 is configured to output, in response to ultrasound signals of the first frequency $F_1$ arriving along the normal direction, voltage signals between the PMUT receiver electrodes (174, 184). In response to ultrasound signals of the first frequency $F_1$ arriving along the normal direction, the portion of the thin-film piezoelectric stack 162 overlying the cavity oscillates at the first frequency $F_1$. Some fraction of the ultrasound signals transmitted by the PMUT transmitter 142 returns to the PMUT receiver 144 as an echo ultrasound signal. In the use case illustrated in FIG. 1, the relative amplitude or energy of the echo ultrasound signal depends upon the presence of a digit (e.g., human finger) or other object (e.g., water droplet) touching the sense region 126. If the sense region 126 is touched by a digit or other object, there is greater attenuation of the echo ultrasound signal than if there is no touching at the sense region 126. By amplifying and processing the time-varying voltage signal from the PMUT receiver at the signal processing circuitry, these touch events can be detected.

Figure 10:
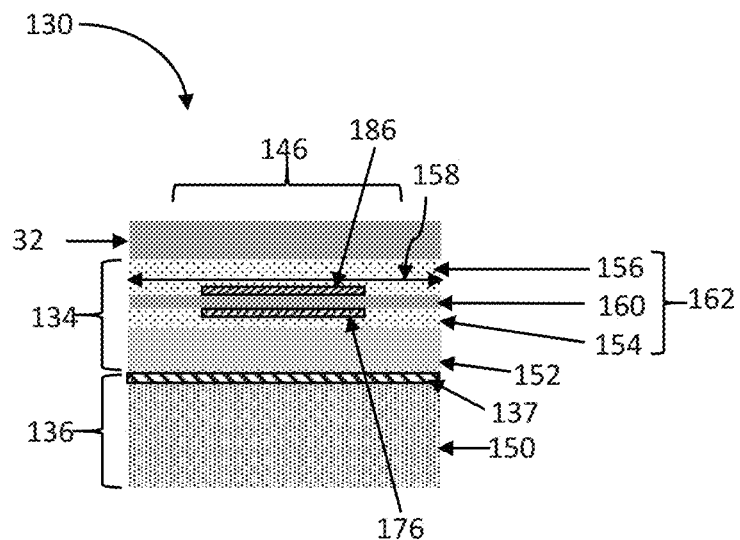
FIG. 10 is a schematic cross-sectional view of a piezoelectric force-measuring element (PMFE).

A portion of the FMTSIC 130 containing a PMFE 146 is shown in cross section in FIG. 10. Also shown is the ASIC portion 136 that is under the PMFE 146 and the encapsulating adhesive 32 that is above the PMFE 146. FIG. 10 shows the PMFE in a quiescent state, in which there is no flexing of the piezoelectric stack 162. In the quiescent state, there is no voltage generated between the PMFE electrodes (176, 186).

Figure 11:
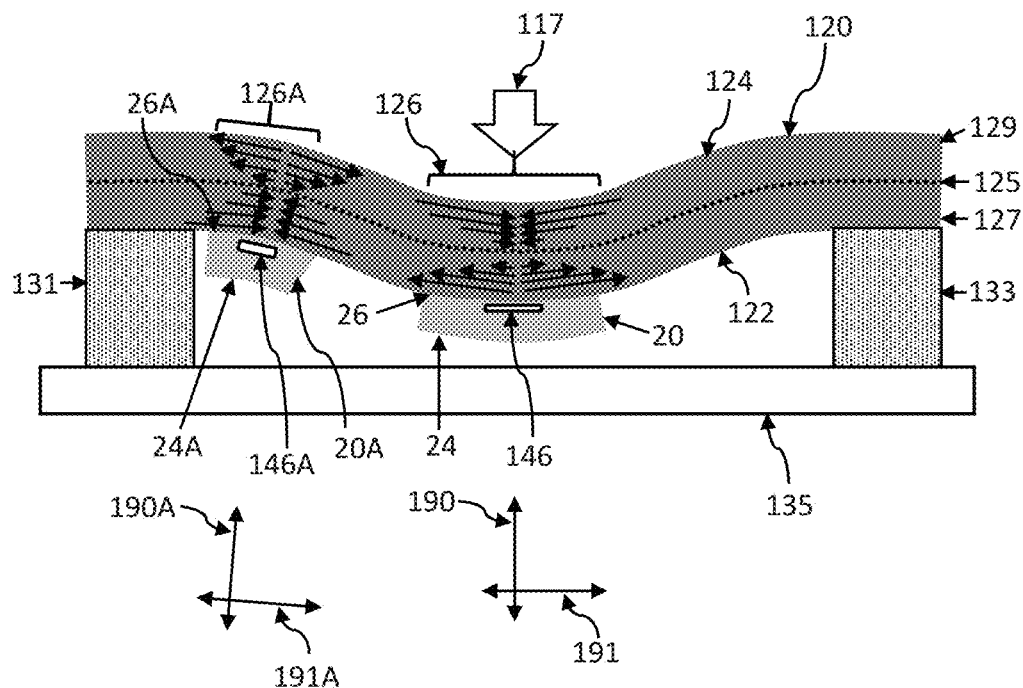
FIGS. 11, 12, and 13 are schematic side views of force-measuring and touch-sensing integrated circuits and a cover layer, attached to each other and undergoing deformation.
Figure 12:
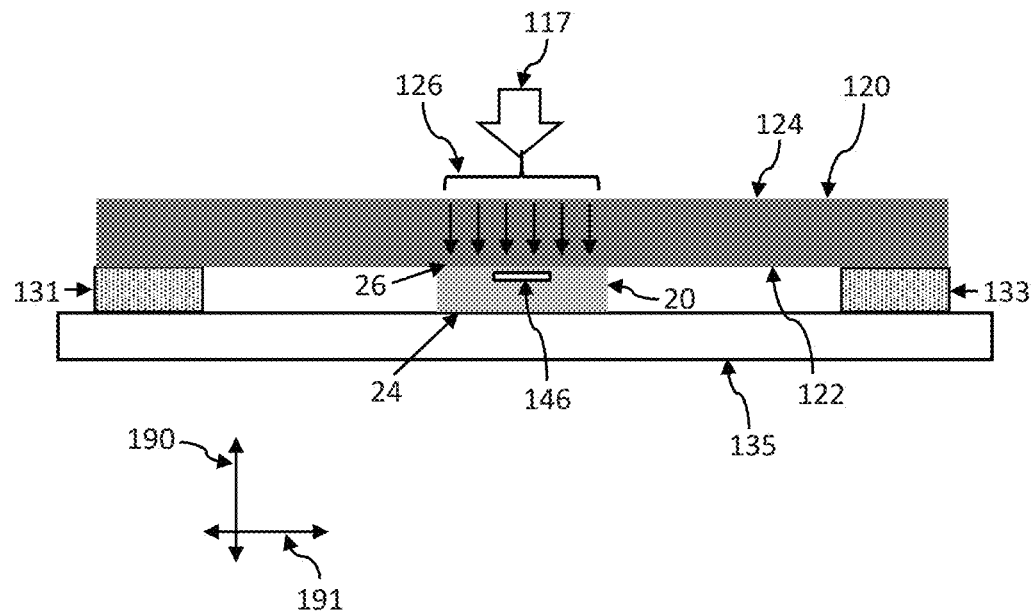
Figure 13:
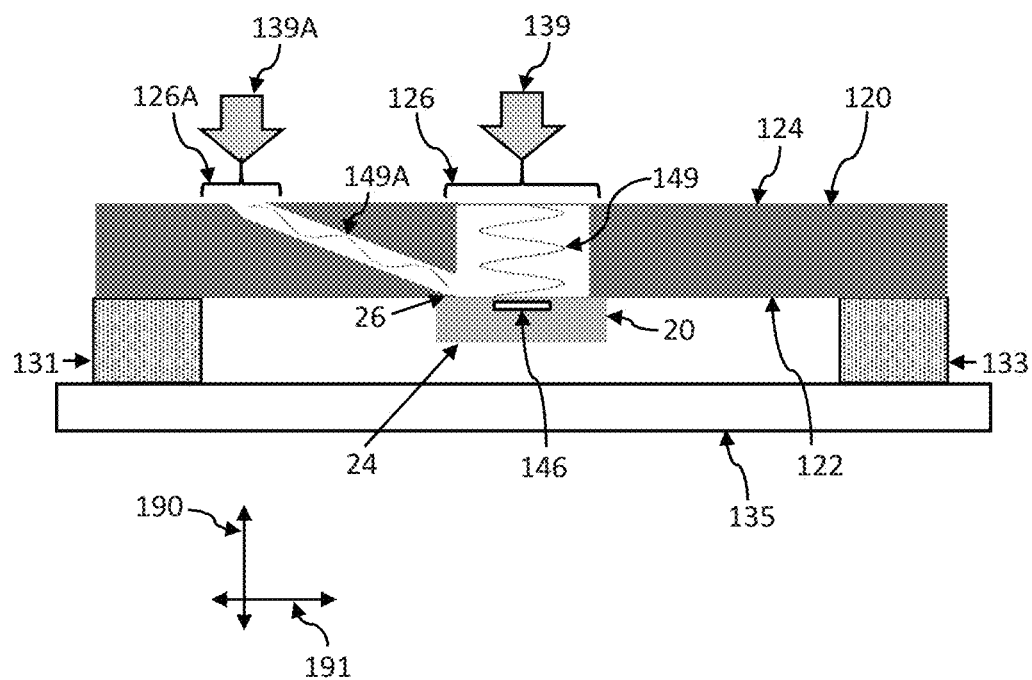

FIGS. 11, 12, and 13 are schematic side views of an FMTSIC 20 and a cover layer 120 attached to or adhered to (coupled to) each other. A top surface (ultrasound transmission surface) 26 of FMTSIC 20 is coupled to inner surface 122 of the cover layer 120. FMTSIC 20 and cover layer 120 overlie a rigid substrate 135. For ease of viewing, other components of system 100 (e.g., flexible circuit 108, ICs 114) have been omitted. FMTSIC 20 includes PMFEs 146. In the examples shown, two anchor posts 131, 133 fix the two ends of the cover layer 120 to the substrate 135.

In the example of FIG. 11, FMTSIC 20 is not anchored to the rigid substrate 135 and can move with the cover layer 120 when the cover layer 120 is deflected upwards or downwards. A downward force 117, shown as a downward arrow, is applied by a finger (or another object) pressing against the outer surface 124 of the cover layer 120 at the sense region 126 for example. A finger pressing against or tapping the outer surface 124 are examples of touch excitation. In the example shown in FIG. 11, the cover layer 120 is deflected in a first direction (e.g., downwards) in response to a touch excitation at the sense region 126. FMTSIC 20 is located approximately half-way between the anchor posts 131, 133 and sense region 126 overlaps FMTSIC 20. A neutral axis 125 is located within the cover layer 120. A lower portion 127 of the cover layer 120, below the neutral axis 125, is under tensile (positive) strain at the sense region 126, represented by outward pointing arrows, primarily along lateral direction 191, perpendicular to the normal direction 190. The lateral direction 191 is approximately parallel to the piezoelectric layer 160 at the respective location of the piezoelectric layer 160 (at region 126). An upper portion 129 of the cover layer 120, above the neutral axis 125, is under compressive (negative) strain at the sense region 126, represented by inward pointing arrows, primarily along lateral direction 191. Since FMTSIC 20 is coupled to the inner surface 122, adjacent to the lower portion 127, the PMFEs 146 are also under tensile (positive) strain. Typically, the entire FMTSIC 20 may be deflected under the applied downward force 117. In the example shown in FIG. 11, the PMFEs 146 are under a positive strain, and the respective portions of the piezoelectric layer 160 at the PMFEs 146 undergo expansion along a lateral direction 191. As a result, an electrical charge is generated at each PMFE (146) between the respective PMFE electrodes (176, 186). This electrical charge is detectable as a first deflection voltage $V_{d1}$ (corresponding to strain of a certain polarity and magnitude). The polarity of the first deflection voltage $V_{d1}$ at a PMFE depends upon the polarity of the strain (positive strain (tensile) or negative strain (compressive)) at the respective portion of the piezoelectric layer between the respective PMFE electrodes of the PMFE. The magnitude of the first deflection voltage $V_{d1}$ at a PMFE depends upon the magnitude of the strain at the respective portion of the piezoelectric layer between the respective PMFE electrodes of the PMFE. Subsequently, when the downward force 117 is no longer applied to the sense region 126, the cover layer 120 deflects in a second direction opposite the first direction (e.g., upwards). This is detectable as a second deflection voltage $V_{d2}$ (corresponding to strain of a certain polarity and magnitude). The polarity of the second deflection voltage $V_{d2}$ at a PMFE depends upon the polarity of the strain at the respective portion of the piezoelectric layer between the respective PMFE electrodes of the PMFE. The magnitude of the second deflection voltage $V_{d2}$ at a PMFE depends upon the magnitude of the strain at the respective portion of the piezoelectric layer between the respective PMFE electrodes of the PMFE.

FIG. 11 shows a second FMTSIC 20A, including PMFEs 146A. A top surface (ultrasound transmission surface) 26A of FMTSIC 20A is coupled to inner surface 122 of the cover layer 120. FMTSIC 20A overlies the rigid substrate 135 and is located at a second region 126A, between anchor post 131 and first FMTSIC 20. Note that FMTSIC 20A is laterally displaced from the location where the downward force 117 is applied to the outer surface 124 (at sense region 126). The lower portion 127 of the cover layer 120 is under compressive (negative) strain at the second region 126A, represented by inward pointing arrows, primarily along the lateral direction 191A, perpendicular to the normal direction 190A. The lateral direction 191A is approximately parallel to the piezoelectric layer 160 at the respective location of the piezoelectric layer 160 (at second region 126A). The upper portion 129 of the cover layer 120 is under tensile (positive) strain at the second region 126A, represented by outward pointing arrows, primarily along the lateral direction 191A. Since FMTSIC 20A is coupled to the inner surface 122, adjacent to the lower portion 127, the PMFEs 146A are also under compressive (negative) strain. These examples illustrate that when the cover layer and the FMTSICs undergo deflection in response to a touch excitation at the outer surface, expansion and/or compression of the piezoelectric layer along the lateral direction may be induced by the deflection of the cover layer.

In the example shown in FIG. 12, the bottom surface 24 of FMTSIC 20 is anchored to the rigid substrate 135. When downward force 117 is applied to the outer surface 124 of the cover layer 120 at sense region 126, the portion of the cover layer 120 at the sense region 126 transmits the downward force along normal direction 190. The portion of the cover layer 120 at the sense region 126 and the FMTSIC 20 undergo compression along normal direction 190. Consequently, the PMFEs 146 including piezoelectric layer 160 are compressed along the normal direction 190, approximately normal to the piezoelectric layer 160. As a result, an electrical charge is generated between the PMFE electrodes (176, 186). This electrical charge is detectable as a voltage $V_c$ (corresponding to a strain of a certain polarity and magnitude) between the PMFE electrodes. The downward force 117 that causes this compression is applied during a touch excitation, such as tapping at or pressing against the outer surface 124. The pressing or the tapping can be repetitive. Typically, the entire FMTSIC 20 may undergo compression. Subsequently, the piezoelectric layer 160 relaxes from the compressed state. In other cases, there may also be compression along a lateral direction 191, or along other directions.

In the example shown in FIG. 13, FMTSIC 20 is not anchored to the rigid substrate 135. A downward force 139, shown as a downward arrow, is applied to the outer surface 124 of the cover layer 120 at the sense region 126. The downward force 139 is generated as a result of an impact of touch excitation at the sense region 126. For example, the downward force 139 is generated as a result of the impact of a finger (or another object) tapping the outer surface at the sense region 126. The touch excitation (e.g., tapping) can be repetitive. The impact of the touch excitation (e.g., tapping) generates elastic waves that travel outward from the location of the impact (on the outer surface 124 at sense region 126) and at least some of the elastic waves travel toward the inner surface 122. Accordingly, at least some portion 149 of the elastic waves are incident on the FMTSIC 20.

In general, an impact of a touch excitation (e.g., tapping) on a surface of a stack (e.g., cover layer) can generate different types of waves including pressure waves, shear waves, surface waves and Lamb waves. Pressure waves, shear waves, and surface waves are in a class of waves called elastic waves. Pressure waves (also called primary waves or P-waves) are waves in which the molecular oscillations (particle oscillations) are parallel to the direction of propagation of the waves. Shear waves (also called secondary waves or S-waves) are waves in which the molecular oscillations (particle oscillations) are perpendicular to the direction of propagation of the waves. Pressure waves and shear waves travel radially outwards from the location of impact. Surface waves are waves in which the energy of the waves are trapped within a short depth from the surface and the waves propagate along the surface of the stack. Lamb waves are elastic waves that can propagate in plates. When an object (e.g., a finger) impacts a surface of a stack, different types of elastic waves can be generated depending upon the specifics of the impact (e.g., speed, angle, duration of contact, details of the contact surface), the relevant material properties (e.g., material properties of the object and the stack), and boundary conditions. For example, pressure waves can be generated when an impact of a touch excitation at the outer surface is approximately normal to the outer surface. For example, shear waves can be generated when an impact of a touch excitation at the outer surface has a component parallel to the outer surface, such as a finger hitting the outer surface at an oblique angle or a finger rubbing against the outer surface. Some of these elastic waves can propagate towards the FMTSIC 20 and PMFEs 146. If the stack is sufficiently thin, then some portion of surface waves can propagate towards the FMTSIC 20 and PMFEs 146 and be detected by the PMFEs 146.

Accordingly, when elastic waves 149 are incident on the FMTSIC 20 and PMFEs 146, the elastic waves induce time-dependent oscillatory deformation to the piezoelectric layer 160 at the PMFE 146. This oscillatory deformation can include: lateral deformation (compression and expansion along the lateral direction 191 approximately parallel to piezoelectric layer 160), normal deformation (compression and expansion along the normal direction 190 approximately normal to the piezoelectric layer 160), and shear deformation. As a result, time-varying electrical charges are generated at each PMFE (146) between the respective PMFE electrodes (176, 186). These time-varying electrical charges are detectable as time-varying voltage signals. The signal processing circuitry amplifies and processes these time-varying voltage signals. Typically, the time-dependent oscillatory deformations induced by an impact of a touch excitation are in a frequency range of 10 Hz to 1 MHz. For example, suppose that elastic waves 149 include pressure waves incident on the PMFEs 146 along the normal direction 190; these pressure waves may induce compression (under a positive pressure wave) and expansion (under a negative pressure wave) of the piezoelectric layer 160 along the normal direction 190. As another example, suppose that elastic waves 149 include shear waves incident on the PMFEs 146 along the normal direction 190; these shear waves may induce compression and expansion of the piezoelectric layer 160 along the lateral direction 191.

Consider another case in which a downward force 139A, shown as a downward arrow, is applied to the outer surface 124 at a second region 126A, between anchor post 131 and FMTSIC 20. The downward force 139A is generated as a result of an impact of touch excitation at the second region 126A. The impact of the touch excitation generates elastic waves that travel outward from the location of the impact (region 126A) and at least some of the elastic waves travel towards the inner surface 122. Accordingly, at least some portion 149A of the elastic waves are incident on the FMTSIC 20, causing the piezoelectric layer 160 to undergo time-dependent oscillatory deformation. As a result, time-varying electrical charges are generated at each PMFE (146) between the respective PMFE electrodes (176, 186). These time-varying electrical charges are detectable as time-varying voltage signals, although the impact of the touch excitation occurred at a second region 126A that is laterally displaced from the sense region 126.

Elastic waves 149A that reach FMTSIC 20 from region 126A may be weaker (for example, smaller in amplitude) than elastic waves 149 that reach FMTSIC 20 from sense region 126, because of a greater distance between the location of impact and the FMTSIC. An array of PMFEs can be configured to be a position-sensitive input device, sensitive to a location of the impact (e.g., tapping) of a touch excitation. An array of PMFEs can be an array of PMFEs in a single FMTSIC or arrays of PMFEs in multiple FMTSICs. For example, a table input apparatus could have an array of FMTSICs located at respective lateral positions underneath the table's top surface, in which each FMTSIC would contain at least one PMFE and preferably multiple PMFEs. The signal processing circuitry can be configured to amplify and process the time-varying voltage signals from the PMFEs and analyze some features of those time-varying voltage signals. Examples of features of time-varying voltage signals are: (1) amplitudes of the time-varying voltage signals, and (2) the relative timing of time-varying voltage signals (the "time-of-flight"). For example, a PMFE exhibiting a shorter time-of-flight is closer to the location of impact than another PMFE exhibiting a longer time-of-flight. The signal processing circuitry can analyze features of time-varying signals (e.g., amplitude and/or time-of-flight) from the PMFEs in an array of PMFEs to estimate a location of impact of a touch excitation.

In operation, PMFE 146 is configured to output voltage signals between the PMFE electrodes (176, 186) in response to a low-frequency mechanical deformation of the portion of the piezoelectric layer 160 between the PMFE electrodes (176, 186). The low-frequency mechanical deformation includes deflection (as illustrated in FIG. 11), compression (as illustrated in FIG. 12), and elastic-wave oscillations (as illustrated in FIG. 13). In an actual touch event, more than one of these effects may be observable. Consider tapping by a finger as an example of a touch excitation. As the finger impacts the outer surface 124, elastic waves are generated which are detectable as time-varying voltage signals at the PMFEs (FIG. 13). Elastic waves are generated by the impact of the touch excitation. Subsequently, as the finger presses against the cover layer, the FMTSIC undergoes deflection (FIG. 11). There is expansion or compression of the piezoelectric layer along a lateral direction. The low-frequency mechanical deformation can be caused by a finger pressing against or tapping at outer surface of the cover layer 120, to which the FMTSIC 20 is attached (coupled). The PMFE 146 is coupled to the signal processing circuitry 137. By amplifying and processing the voltage signals from the PMFE at the signal processing circuitry, the strain that results from the low-frequency mechanical deformation of the piezoelectric layer can be measured.

It is possible to adjust the relative amplitudes of the PMFE voltage signals attributable to the elastic-wave oscillations (FIG. 13) and lateral expansion and compression due to deflection (FIG. 11). For example, one can choose the cover layer to be more or less deformable. For example, the cover layer 120 of FIG. 13 may be thicker and/or made of more rigid material than the cover layer 120 of FIG. 11.

Figure 14:
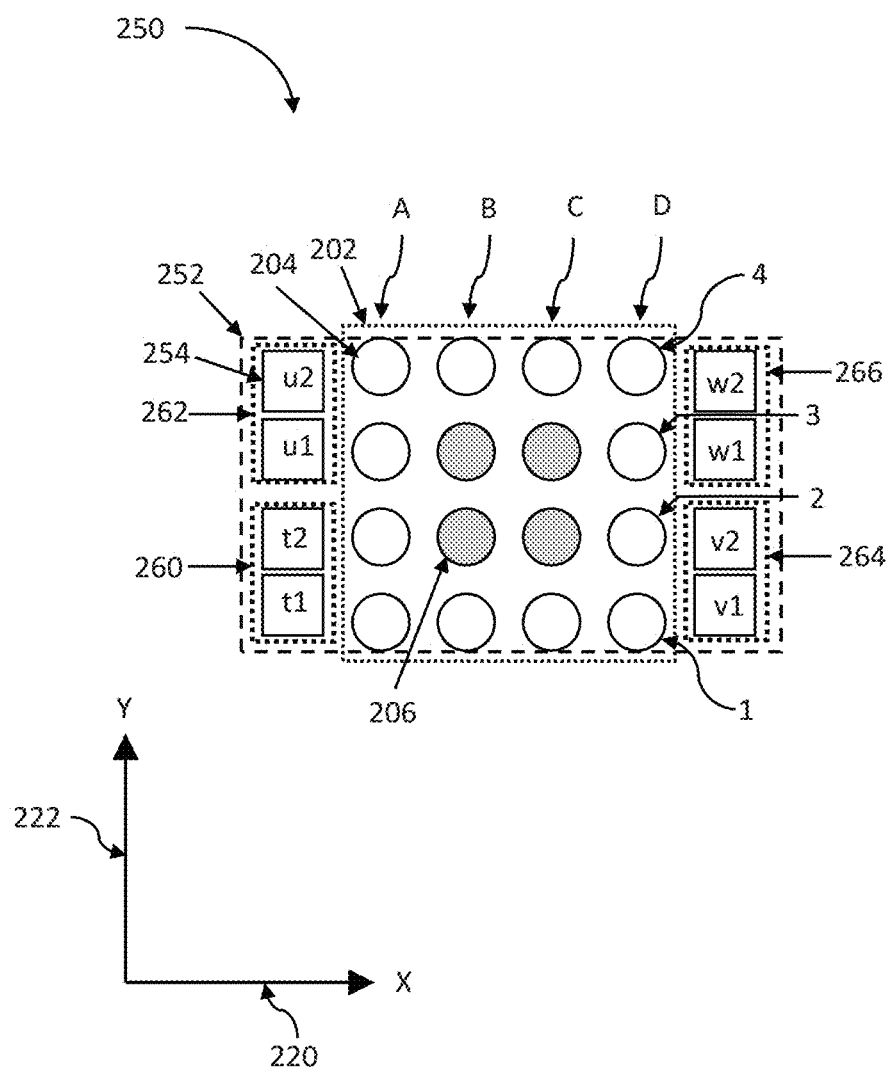
FIG. 14 is a schematic top view of the MEMS portion of an example force-measuring and touch-sensing integrated circuit device.

PMFE 146 is configured to output voltage signals between the PMFE electrodes (176, 186) in response to low-frequency mechanical deformation. Typically, the low-frequency deformation is induced by touch excitation which is not repetitive (repetition rate is effectively 0 Hz) or is repetitive having a repetition rate of 100 Hz or less, or 10 Hz or less. These repetition rates correspond to the repetition rates of a repetitive touch excitation, e.g., a finger repeatedly pressing against or tapping the sense region. An example of a repetition rate calculation is explained with reference to FIG. 20. In the example shown in FIG. 20, the repetition rate is approximately 2.4 Hz. An FMTSIC can contain multiple PMUT transmitters, PMUT receivers, and PMFEs. FIG. 14 is a top view of a MEMS portion 250 of an FMTSIC device. The PMUTs (PMUT transmitters 204 shown as white circles and PMUT receivers 206 shown as grey circles) are arranged in a two-dimensional array, extending along the X-axis (220) and Y-axis (222). The PMUTs are arranged in columns (A, B, C, and D) and rows (1, 2, 3, and 4). In the example shown, the two-dimensional PMUT array 202 has a square outer perimeter, but in other examples the outer perimeter can have other shapes such as a rectangle. In the example shown, the total number of PMUTs is 16, of which 12 are PMUT transmitters 204 and 4 are PMUT receivers 206. The PMUT receivers number less than the PMUT transmitters. The PMUTs are shown as circles because the overlap area of the first (bottom) electrode 172 and the second (top) electrode 174 is approximately circular. In other examples, the overlap area can have other shapes, such as a square. In the example shown, the PMUTs are of the same lateral size (area), but in other examples PMUTs of different sizes are also possible.

The PMUT transmitters 204 are configured to transmit, upon application of voltage signals between the respective first PMUT electrode and the respective second PMUT electrode, ultrasound signals of a first frequency $F_1$, in longitudinal mode(s) propagating along a normal direction approximately normal to the thin-film piezoelectric stack and away from the cavities. A benefit to a two-dimensional array of PMUT transmitters is that by optimization of the voltage signals (timing and/or amplitudes) to each of the PMUT transmitters, the transmitted ultrasound signals can be made to interfere constructively to achieve a beam-forming effect if desired. The PMUT receivers 206 are configured to output, in response to ultrasound signals of the first frequency $F_1$ arriving along the normal direction, voltage signals between the respective first PMUT electrode and the respective second PMUT electrode. In the example shown, the piezoelectric capacitors constituting the PMUT receivers 206 are connected to each other in parallel. Since the capacitances of these PMUT receivers are added together, this arrangement of PMUT receivers is less sensitive to the effects of parasitic capacitance.

The MEMS portion includes eight PMFEs (254) arranged in a two-dimensional array 252. The PMFE array 252 has an opening, which is devoid of PMFEs, in which the PMUT array 202 is disposed. The PMFEs are arranged into four sets (260, 262, 264, and 266), where each set is associated with a different X and Y location. Therefore, the PMFE array 252 achieves a two-dimensional positional resolution of applied forces measurement. Each PMFE set contains two PMFEs. In the example shown, set 260 contains t1 and t2, set 262 contains u1 and u2, set 264 contains v1 and v2, and set 266 contains w1 and w2. The PMFEs in a set are electrically connected to each other. In this example, the piezoelectric capacitors constituting each PMFE in a set are connected to each other in series. An advantage to combining the touch-sensing (PMUTs) and force-measuring (PMFEs) functions into one integrated circuit device is that it becomes possible to distinguish between stationary objects that touch but do not apply significant force (e.g., water droplet on sense region 126) and moving objects that touch and apply significant force (e.g., finger).

The PMUT arrays shown in FIG. 12 illustrated examples of PMUT arrays configured to operate at a single frequency $F_1$, in which the PMUT transmitters transmit ultrasound signals at $F_1$ and the PMUT receivers are configured to receive ultrasound signals at frequency $F_1$. In other cases, PMUT arrays can be configured to operate at frequencies $F_1$ and $F_2$. For example, a PMUT array contains first PMUT transmitters configured to transmit ultrasound signals at a first frequency first PMUT receivers configured to receive ultrasound signals at a first frequency $F_1$, second PMUT transmitters configured to transmit ultrasound signals at a second frequency $F_2$, and second PMUT receivers configured to receive ultrasound signals at a second frequency $F_2$.

If the cover layer 120 is at room temperature (approximately 25° C.) and a human finger (approximately 37° C.) touches it at the sense region 126, temperatures in the sense region 126 and surrounding areas, including the FMTSICs (102, 106), might increase. There is likely to be temperature-induced drift in the ultrasound signal measured at the PMUT receivers. In order to reduce the effect of this temperature-induced drift, it may be preferable to operate the PMUT transmitters and PMUT receivers at two different frequencies $F_1$ and $F_2$, because the temperature-dependent drift characteristics will be different at different frequencies $F_1$ and $F_2$. Both frequencies $F_1$ and $F_2$ are preferably in a range of 0.1 MHz to 25 MHz. In order to minimize temperature-induced drift, the frequencies $F_1$ and $F_2$ are preferably sufficiently different from each other such that the temperature-dependent drift characteristics will be sufficiently different from each other. On the other hand, suppose that the first transmitters operate at a first central frequency $F_1$ with a bandwidth $\Delta F_1$, and the second transmitters operate at a second central frequency $F_2$ with a bandwidth $\Delta F_2$, with $F_1 < F_2$. If the frequencies and bandwidths are selected such that $F_1 + \Delta F_1/2$ is greater than $F_2 - \Delta F_2/2$ (the first and second bands overlap), then the power transmitted by the first and second transmitters will be additive. Accordingly, there are operational advantages to selecting the frequencies $F_1$ and $F_2$ to be sufficiently close to each other.

Figure 15:
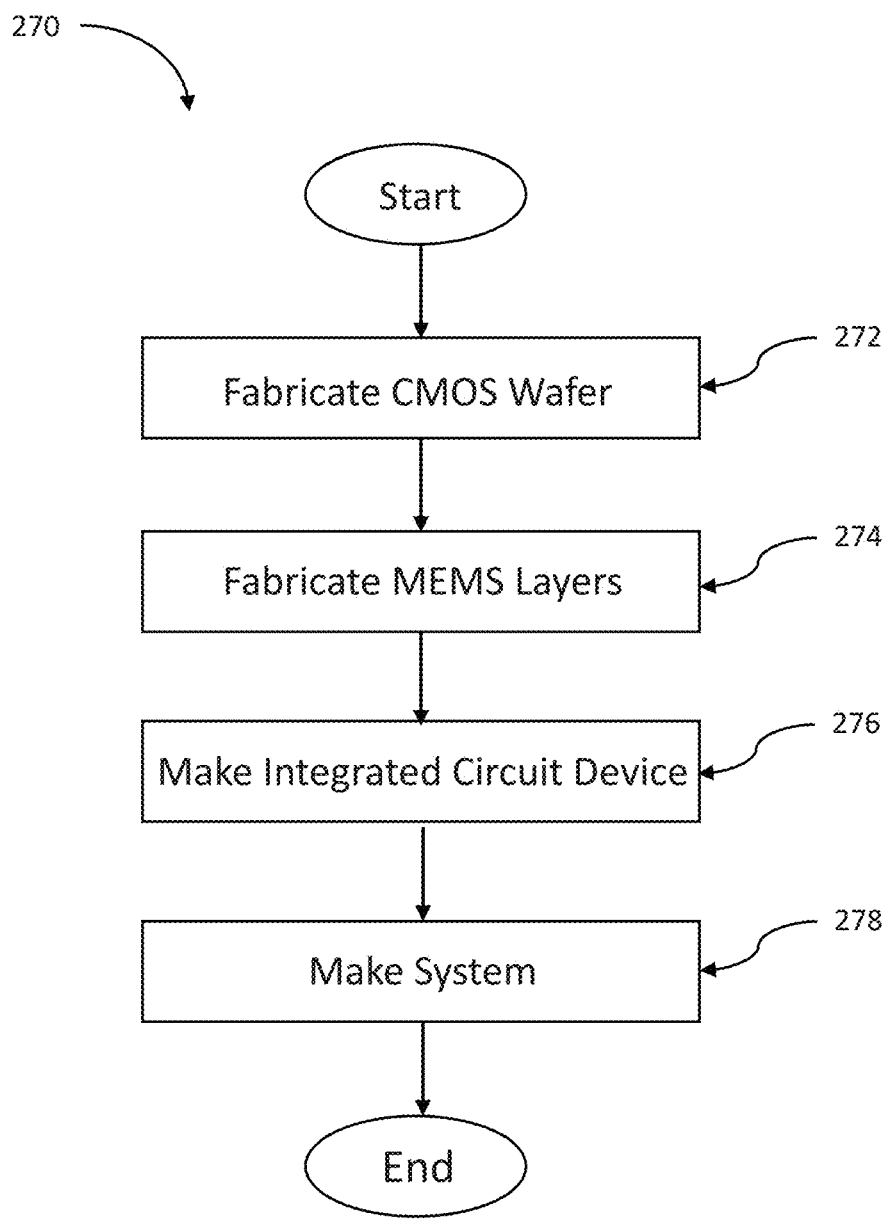
FIG. 15 is a flow diagram of a process of making a force-measuring and touch-sensing integrated circuit and an input system according to the present invention.

FIG. 15 shows a flow diagram 270 for the process of making a FMTSIC 20 and an input system. The method includes steps 272, 274, 276, and 278. At step 272, the ASIC portion 136 including signal processing circuitry 137 is fabricated on a semiconductor substrate (wafer) 150 using a CMOS fabrication process (FIG. 3). At step 274, the MEMS portion 134 is fabricated on top of the ASIC portion 136. At step 276, the integrated circuit device, FMTSIC 20, is made. This step 276 includes, for example, the singulation of the wafer into dies, the mounting of dies onto a package substrate, and the packaging of the die including application of an epoxy adhesive. The making of FMTSICs is complete at the end of step 276. Subsequently, an input system is made at step 278.

For example, the system can be implemented in a mobile appliance (e.g., Smartphone, tablet computer, laptop computer), a household appliance (e.g., washing machine, drier, light switches, air conditioner, refrigerator, oven, remote controller devices), a medical appliance, an industrial appliance, an office appliance, an automobile, or an airplane, or a component of any of the above. This step 278 includes, for example, the mounting of one or more FMTSIC devices and other ICs to a flexible circuit substrate and/or printed circuit board (PCB) and adhering the FMTSIC devices to an interior surface of a cover layer of an apparatus.

Step 278 may include a testing procedure carried out on PMFE(s) after adhering the FMTSIC device(s) to the interior surface of the cover layer. This testing procedure preferably includes the application of a testing force, in a range of 0.5 N to 10 N at the sense region. For example, suppose that upon application of a testing force of 7.5 N, a magnitude of the PMFE digital data (difference between maximum PMFE digital data (e.g., 542 in FIG. 23) and minimum PMFE digital data (e.g., 544 in FIG. 23)) is 1280 LSB. It is possible to calculate one or both of the following: (1) a ratio A of a magnitude of the PMFE digital data to a physical force value; and/or (2) a ratio B of a physical force value to a magnitude of the PMFE digital data. In this example, the ratio A=1280 LSB/7.5 N and the ratio B=7.5 N/1280 LSB. These ratios A and B permit a conversion between PMFE digital data (expressed in LSB) and a physical force value (expressed in Newtons). These ratios A and/or B can be stored in a memory store (non-volatile memory) of the respective FMTSIC.

Step 278 may include a testing procedure carried out on PMUT(s) after adhering the FMTSICs to the interior surface of the cover layer. This testing procedure preferably includes contacting an object to the sense region (touch event) in which a force, in a range of 0.5 N to 10 N, is applied at the sense region. For example, suppose that upon contacting an object in which a testing force of 7.5 N is applied, the PMUT digital data decrease by 230 LSB (e.g., from the baseline 426 to a minimum signal 430 in FIG. 21). Accordingly, the dynamic range (difference between baseline and minimum signal) is 230 LSB under application of a testing force of 7.5 N. These dynamic range and testing force data can be stored in a memory store (non-volatile memory) of the respective FMTSIC.

Figure 16:
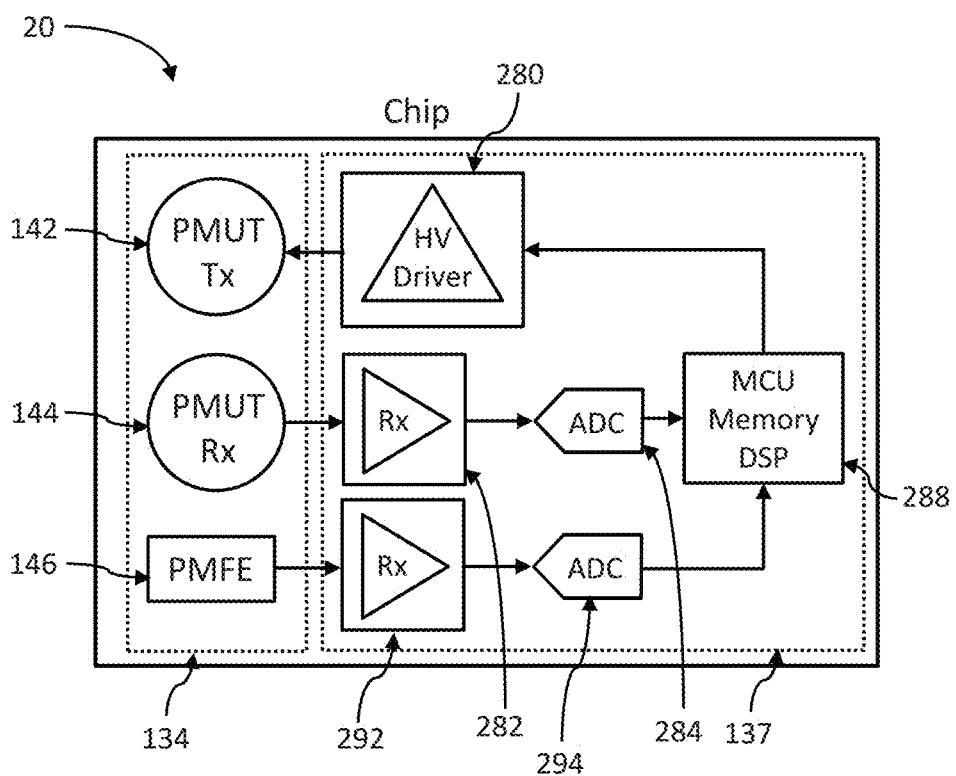
FIGS. 16, 17, 18, and 19 are block diagrams of illustrative force-measuring and touch-sensing systems.

FIG. 16 is a block diagram of the FMTSIC 20, which is an example of a force-measuring and touch-sensing system, integrated into a single integrated circuit device. FMTSIC 20 includes a MEMS portion 134 and signal processing circuitry 137 (in the ASIC portion). The MEMS portion 134 includes PMUT transmitters 142, PMUT receivers 144, and PMFEs 146. Signal processing circuitry 137 includes a high-voltage domain and a low-voltage domain. The high-voltage domain is capable of operating at higher voltages required for driving the PMUT transmitters. The high-voltage domain includes high-voltage transceiver circuitry 280, including high-voltage drivers. The high-voltage transceiver circuitry 280 is electrically connected to the first PMUT electrodes and the second PMUT electrodes of the PMUT transmitters. The high-voltage transceiver is configured to output voltage pulses of 5 V or greater, depending on the requirements of the PMUT transmitters. The low-voltage domain includes amplifiers (282, 292), analog-to-digital converters (ADCs) (284, 294), and processing circuit blocks 288. The processing circuit blocks 288 can include microcontrollers (MCUs), memories, and digital signal processors (DSPs), for example. There may be additional processing circuits located off-chip that are connected to the processing circuit blocks 288. Such additional processing circuits can be contained in other ICs 114 in FIG. 1.

The processing circuit blocks 288 are electrically connected to the high-voltage transceiver circuitry 280 and the ADCs (284, 294). The processing circuit blocks 288 generate time-varying signals that are transmitted to the high-voltage transceiver circuitry 280. The high-voltage transceiver circuitry transmits high-voltage signals to the PMUT transmitters 142 in accordance with the time-varying signals from the processing circuit blocks. Voltage signals output by the PMUT receivers 144 reach amplifiers 282 that are electrically connected to PMUT receivers 144 and get amplified by the amplifiers 282. The amplified voltage signals are sent to ADC 284 to be converted to digital signals (PMUT digital data) which can be processed or stored by the processing circuit blocks 288. Similarly, voltage signals output by PMFEs 146 reach amplifiers 292 that are electrically connected to PMFEs 146 and get amplified by the amplifiers 292. These amplified voltage signals are sent to ADC 294 to be converted to digital signals (PMFE digital data) which can be processed or stored by processing circuit blocks 288. The methods (algorithms) described herein can be carried out at the processing circuit blocks (288) using data derived from the PMUT receivers 144 and PMFEs 146. In the example shown, the piezoelectric capacitors constituting the PMUT receivers 144 are connected in parallel. Accordingly, there is a unified voltage signal transmitted from the PMUT receivers 144 to the amplifiers 282.

Figure 17:
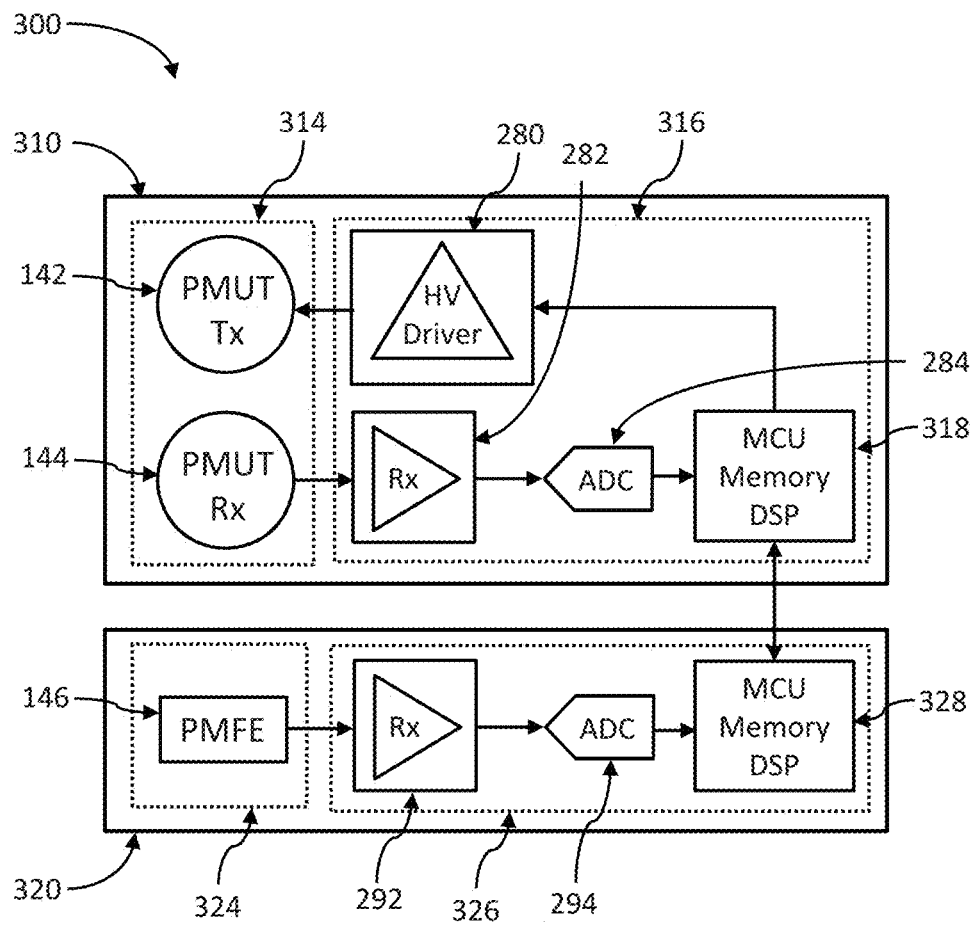

FIG. 17 is a block diagram of a force-measuring and touch-sensing system 300, including a touch-sensing IC device 310 and a force-measuring IC device 320. Touch-sensing IC device 310 includes a MEMS portion 314 and signal processing circuitry 316 (in an ASIC portion). The MEMS portion 314 includes PMUT transmitters 142 and PMUT receivers 144. Signal processing circuitry 316 includes high-voltage transceiver circuitry 280 (including high-voltage drivers) electrically connected to PMUT transmitters 142, amplifiers (282) electrically connected to PMUT receivers 144, and ADCs (284) electrically connected to amplifiers 282. Force-measuring IC device 320 includes a MEMS portion 324 and signal processing circuitry 326. The MEMS portion 314 includes PMFEs 146. Signal processing circuitry 326 includes amplifiers (292) electrically connected to PMFEs 146 and ADCs (294) electrically connected to amplifiers 292. Additionally, the signal processing circuitry (316, 326) of each IC device (310, 320) includes processing circuit blocks (318, 328) which can include microcontrollers (MCUs), memories, and digital signal processors (DSPs), for example.

The processing circuit blocks 318 are electrically connected to the high-voltage transceiver circuitry 280 and the ADCs (284). The processing circuit blocks 318 generate time-varying signals that are transmitted to the high-voltage transceiver circuitry 280. The high-voltage transceiver circuitry transmits high-voltage signals to the PMUT transmitters 142 in accordance with the time-varying signals from the processing circuit blocks 318. Voltage signals output by the PMUT receivers 144 reach amplifiers 282 that are electrically connected to PMUT receivers 144 and get amplified by the amplifiers 282. The amplified voltage signals are sent to ADC 284 to be converted to digital signals (PMUT digital data) which can be processed or stored by the processing circuit blocks 318. Similarly, voltage signals output by PMFEs 146 reach amplifiers 292 that are electrically connected to PMFEs 146 and get amplified by the amplifiers 292. These amplified voltage signals are sent to ADC 294 to be converted to digital signals (PMFE digital data) which can be processed or stored by processing circuit blocks 328. There are electrical interconnections between the processing circuit blocks (318, 328) of the respective IC devices (310, 320). The methods (algorithms) described herein can be carried out at one or more of the processing circuit blocks (318, 328) using data derived from the PMUT receivers 144 and PMFEs 146.

Figure 18:
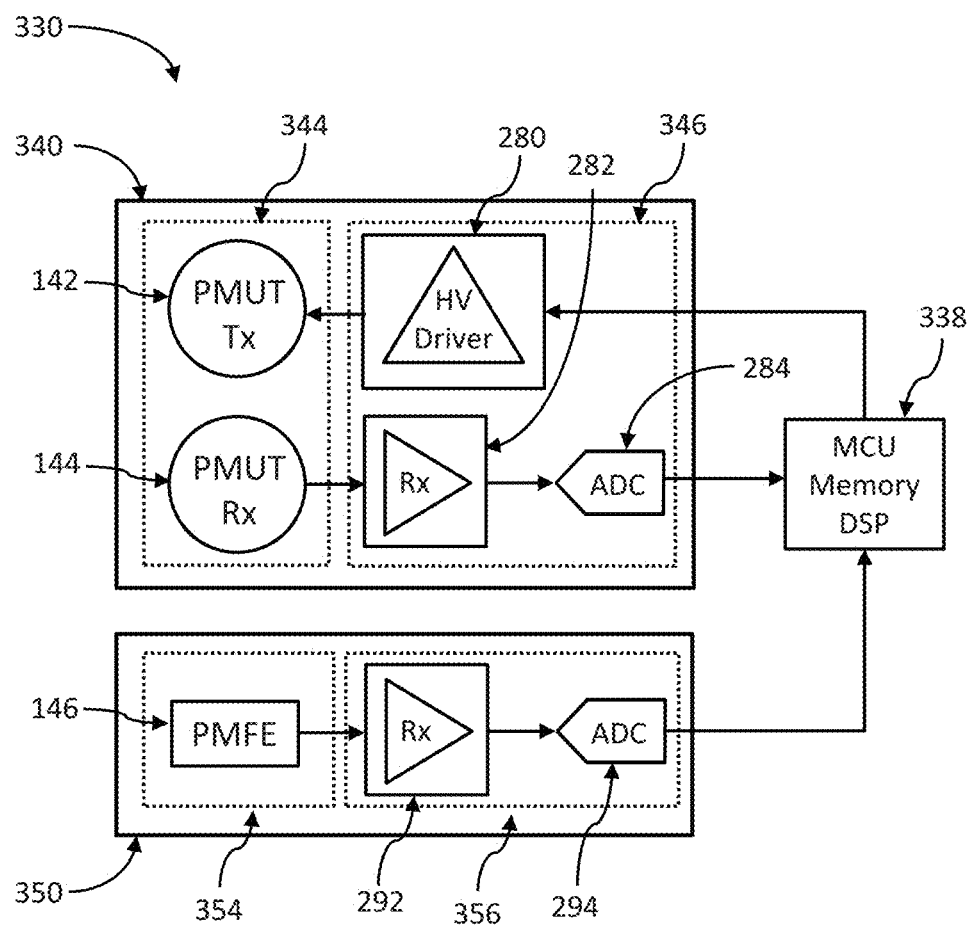

FIG. 18 is a block diagram of a force-measuring and touch-sensing system 330, including a touch-sensing IC device 340 and a force-measuring IC device 350. In some respects, this force-measuring and touch-sensing system 330 is similar to the system 300 of FIG. 17. Touch-sensing IC device 340 includes a MEMS portion 344 and signal processing circuitry 346 (in an ASIC portion). The MEMS portion 344 includes PMUT transmitters 142 and PMUT receivers 144. Signal processing circuitry 346 includes high-voltage transceiver circuitry 280 (including high-voltage drivers) electrically connected to PMUT transmitters 142, amplifiers (282) electrically connected to PMUT receivers 144, and ADCs (284) electrically connected to amplifiers 282. Force-measuring IC device 350 includes a MEMS portion 354 and signal processing circuitry 356. The MEMS portion 354 includes PMFEs 146. Signal processing circuitry 356 includes amplifiers (292) electrically connected to PMFEs 146 and ADCs (294) electrically connected to amplifiers 292. The system 330 additionally includes processing circuit blocks 338, which are not contained in either of the IC devices (340, 350). The processing circuit blocks 338 can include microcontrollers (MCUs), memories, and digital signal processors (DSPs), for example.

The processing circuit blocks 338 are electrically connected to the high-voltage transceiver circuitry 280 and the ADCs (284, 294). The processing circuit blocks 338 generate time-varying signals that are transmitted to the high-voltage transceiver circuitry 280. The high-voltage transceiver circuitry transmits high-voltage signals to the PMUT transmitters 142 in accordance with the time-varying signals from the processing circuit blocks 338. Voltage signals output by the PMUT receivers 144 reach amplifiers 282 that are electrically connected to PMUT receivers 144 and get amplified by the amplifiers 282. The amplified voltage signals are sent to ADC 284 to be converted to digital signals (PMUT digital data) which can be processed or stored by the processing circuit blocks 338. Similarly, voltage signals output by PMFEs 146 reach amplifiers 292 that are electrically connected to PMFEs 146 and get amplified by the amplifiers 292. These amplified voltage signals are sent to ADC 294 to be converted to digital signals (PMFE digital data) which can be processed or stored by processing circuit blocks 338. The methods (algorithms) described herein can be carried out at the processing circuit blocks (338) using data obtained from the PMUT receivers 144 and PMFEs 146. In one configuration, the processing circuit blocks 338 can be mounted to a circuit board.

Figure 19:
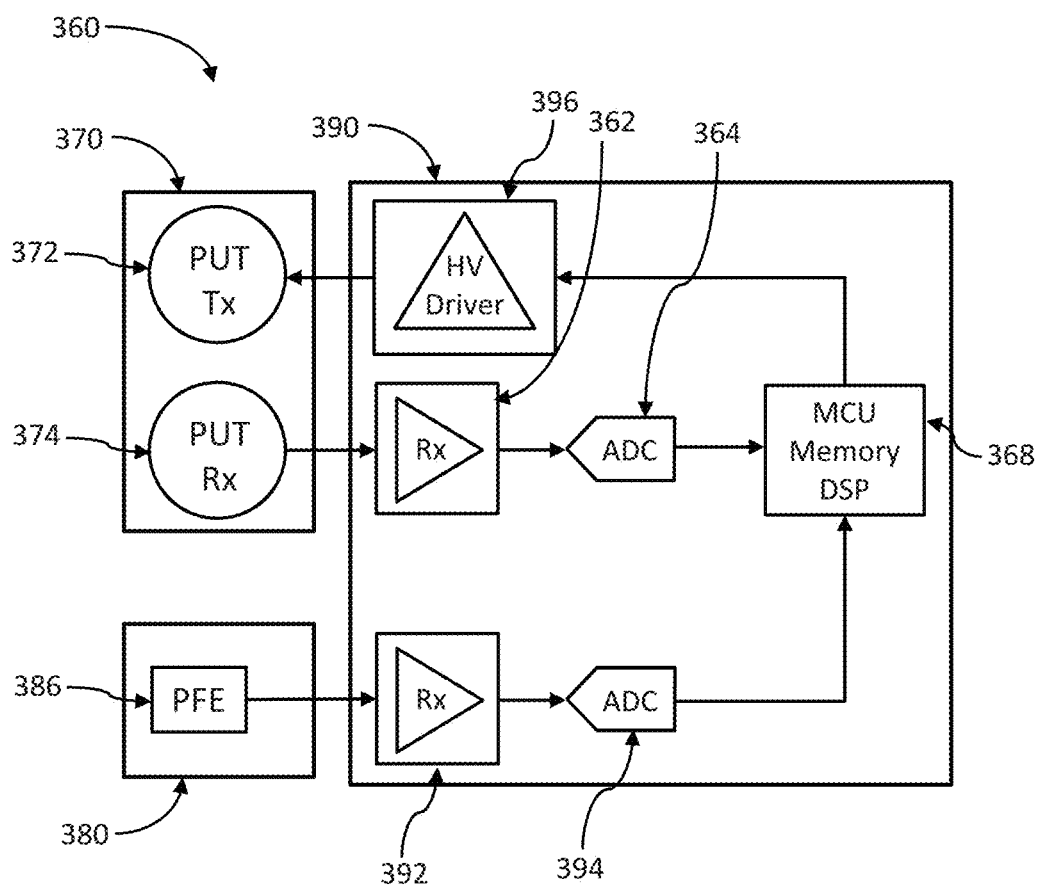

FIG. 19 is a block diagram of a force-measuring and touch-sensing system 360, including a touch-sensing device 370, a force-measuring device 380, and a signal processing circuit 390. The touch-sensing device 370 includes piezoelectric transducers (PUTs) that could be but are not necessarily piezoelectric micromechanical ultrasonic transducers (PMUTs). Similarly, force-measuring device 380 includes piezoelectric force-measuring elements (PFEs) that could be but are not necessarily piezoelectric micromechanical force-measuring elements (PMFEs). Generally, each PUT or PFE comprises a piezoelectric capacitor, including a first electrode, a second electrode, and a layer or film of piezoelectric material between the first electrode and the second electrode. Accordingly, it is not necessary that PUTs or PFEs be implemented in integrated circuit devices or MEMS devices. Instead, PUTs and PFEs can be implemented as discrete components that are not IC devices or MEMS devices. In the example shown, the touch-sensing device 370 includes PUTs configured as PUT transmitters 372 and PUT receivers 374. The force-measuring device 380 includes PFEs 386. Signal processing circuitry 390 includes high-voltage transceiver circuitry 392 (including high-voltage drivers) electrically connected to PUT transmitters 372, amplifiers (362) electrically connected to PUT receivers 374, and ADCs (364) electrically connected to amplifiers 362. Signal processing circuitry 390 additionally includes amplifiers (392) electrically connected to PFEs 386 and ADCs (394) electrically connected to amplifiers 392. The signal processing circuitry 390 additionally includes processing circuit blocks 368. The processing circuit blocks 368 can include microcontrollers (MCUs), memories, and digital signal processors (DSPs), for example.

The processing circuit blocks 368 are electrically connected to the high-voltage transceiver circuitry 396 and the ADCs (364, 394). The processing circuit blocks 368 generate time-varying signals that are transmitted to the high-voltage transceiver circuitry 396. The high-voltage transceiver circuitry transmits high-voltage signals to the PUT transmitters 372 in accordance with the time-varying signals from the processing circuit blocks 368. Voltage signals output by the PUT receivers 374 reach amplifiers 362 that are electrically connected to PMUT receivers 374 and get amplified by the amplifiers 362. The amplified voltage signals are sent to ADC 364 to be converted to digital signals (PUT digital data) which can be processed or stored by the processing circuit blocks 368. Similarly, voltage signals output by PFEs 386 reach amplifiers 392 that are electrically connected to PFEs 386 and get amplified by the amplifiers 392. These amplified voltage signals are sent to ADC 394 to be converted to digital signals (PFE digital data) which can be processed or stored by processing circuit blocks 368. The methods (algorithms) described herein can be carried out at the processing circuit blocks (368) using data obtained from the PUT receivers 374 and PFEs 386.

In various use cases, the sense region that is contacted by an object would have lateral dimensions of 10 mm by 10 mm or less. The lateral dimensions of an integrated circuit device 20 (FIG. 16) would typically be 10 mm by 10 mm or less. Accordingly, it would be possible and preferable to set a closest distance between a PMFE and a PMUT to be 5 mm or less, since both the PMFE and PMUT would be contained in a single IC device. A close distance between a PMFE and a PMUT is preferable for reducing or minimizing false triggering. In cases where the PMUTs and PMFEs are contained in separate IC devices (FIGS. 17 and 18), the IC devices should be positioned in close proximity to each other such that a closest distance between a PMFE and a PMUT would be 5 mm or less.

Figure 20:
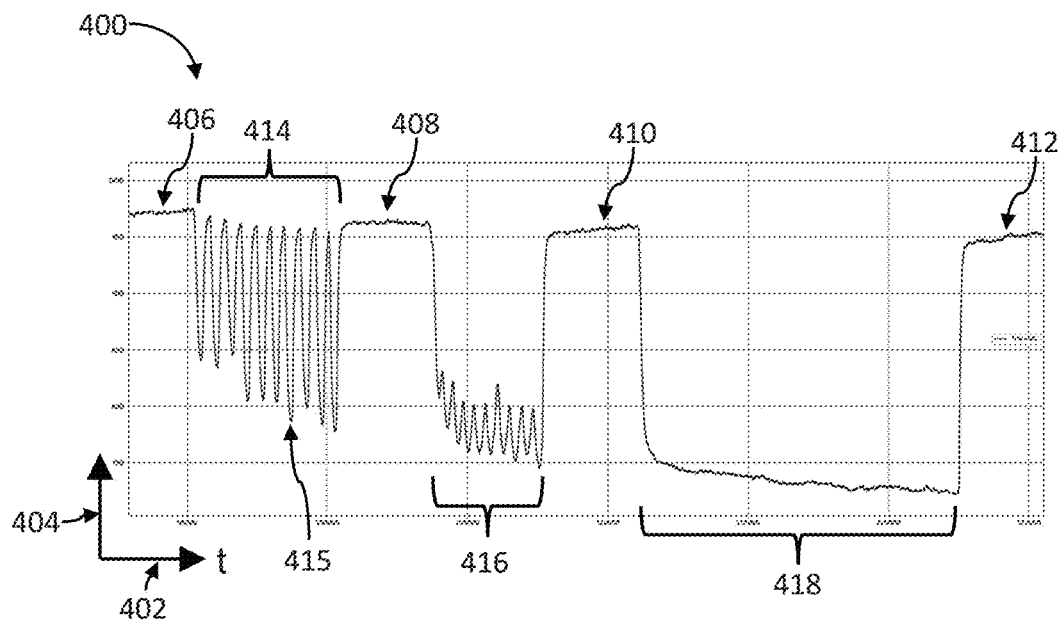
FIG. 20 is a diagram showing a graphical plot of example PMUT digital data over a longer time duration.

An example of a PMUT digital data is shown in FIG. 20, which shows graphical plot 400 of illustrative PMUT digital data, after ADC and before additional processing (e.g., high-pass filtering). The graphical plot has a horizontal axis 402 showing time t, in which 1 division corresponds to 5000 ms, and a vertical axis 404 showing PMUT digital data (e.g., data output from ADC 284 of FIG. 16). Graphical plot 400 includes sections 406, 414, 408, 416, 410, 418, and 412 (ordered sequentially). Graphical plot portions 406, 408, 410, and 412 correspond to time periods during which there is nothing touching or coming into contact with the sense region. These graphical plot sections 406, 408, 410, and 412 show the baseline signal, which exhibits a drift. Plot section 414 corresponds to repetitive pressing of a digit (e.g., a finger) on the sense region, wherein each valley 415 in the PMUT signal corresponds to one occurrence of the digit pressing at the sense region. In the example shown, plot section 414 shows 10 repetitions of the digit pressing at the sense region. After each repetition, the digit is completely released (removed) from the sense region. Plot section 416 also corresponds to repetitive pressing of the digit on the sense region, but after each repetition, the digit is not completely removed from the sense region. During the duration of plot section 416, the digit is in contact with the sense region. Plot section 418 corresponds to the digit touching the sense region and being held against the sense region continuously.

Figure 21:
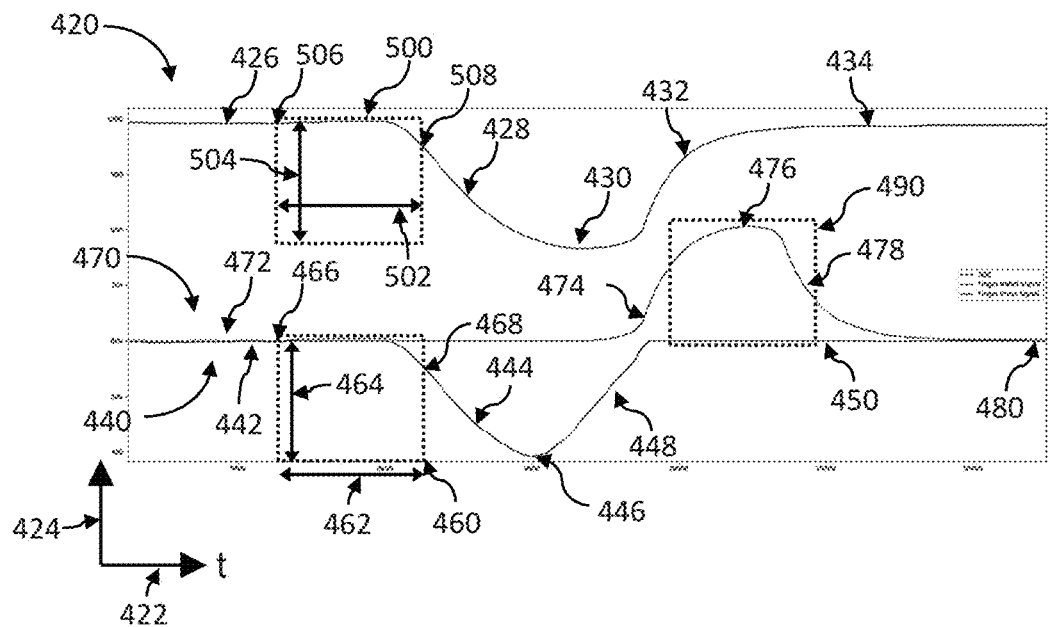
FIG. 21 is a diagram showing graphical plots of example PMUT digital data over a shorter time duration.

FIG. 21 shows graphical plots 420, 440, and 470 of illustrative PMUT digital data. The graphical plots have a horizontal axis 422 showing time t, in which 1 division corresponds to 200 ms, and a vertical axis 424 showing PMUT digital data. Graphical plot 420 is a graphical plot of PMUT digital data (e.g., data output from ADC 284 of FIG. 16, before additional processing) and corresponds to one occurrence of a digit pressing on the sense region and the digit being completely removed (released) from the sense region. Graphical plot 420 includes plot sections 426, 428, 430, 432, and 434 (ordered sequentially). Graphical plot portions 426 and 434 correspond to time periods during which there is nothing touching or coming into contact with the sense region. These graphical plot sections 426 and 434 show the baseline signal. During the duration of plot section 428, the PMUT digital signal is decreasing from the baseline (derivative of PMUT digital signal with respect to time is negative), approximately corresponding to the digit coming into contact with the sense region and the digit pressing at the sense region. The PMUT digital signal reaches a minimum at plot section 430. During the duration of plot section 432, the PMUT digital signal is increasing from the minimum (derivative of PMUT digital signal with respect to time is positive), approximately corresponding to the digit being released from the sense region.

The PMUT digital signal (420) undergoes additional processing. In the example shown in FIG. 21, there are two processed outputs (440, 470) from the PMUT digital signal. Plots 440, 470 show the PMUT digital signal 420 after passing through a high-pass filter as follows: plot 440 shows the high-pass filtered output that is less than or equal to 0 and plot 470 shows the high-pass filtered output that is greater than or equal to 0. The high-pass filter processing can be carried out on the output from the ADCs (e.g., ADC 284 of FIG. 16). In the example shown in FIG. 16, the high-pass filtering process is carried out at the processing circuit block 288.

Graphical plot 440 (negative-side high-pass filtered PMUT digital signal) includes plot sections 442, 444, 446, 448, and 450, ordered sequentially. Plot sections 442 and 450 show the baseline signal. During the duration of plot section 444, the high-pass filtered PMUT digital signal (negative side) is decreasing from the baseline. The high-pass filtered PMUT digital signal (negative side) reaches a minimum at plot section 446. During the duration of plot section 448, the high-pass filtered PMUT digital signal (negative side) is increasing from the minimum. Plot sections 444, 446, and 448 can correspond to an object, such as a digit, touching and pressing at the sense region. Accordingly, the negative-side high-pass filtered PMUT digital signal is sometimes referred to as a press signal.

Graphical plot 470 (positive-side high-pass filtered PMUT digital signal) includes plot sections 472, 474, 476, 478, and 480, ordered sequentially. Plot sections 472 and 480 show the baseline signal. During the duration of plot section 474, the high-pass filtered PMUT digital signal (positive side) is increasing from the baseline. The high-pass filtered PMUT digital signal (positive side) reaches a maximum at plot section 476. During the duration of plot section 478, the high-pass filtered PMUT digital signal (positive side) is decreasing from the maximum. Plot sections 474, 476, and 478 can correspond to an object, such as a digit, being released from the sense region. Accordingly, the positive-side high-pass filtered PMUT digital signal is sometimes referred to as a release signal or relief signal. An end of the plot section 448, corresponding to the negative-side high-pass filtered PMUT digital data increasing toward the baseline, and a beginning of the plot section 474, corresponding to the positive-side high-pass filtered PMUT digital data increasing from the baseline, occur approximately concurrently.

A moving time window can be applied to the PMUT digital data before high-pass filtering, shown as plot 420. An illustrative moving time window 500, at a particular time, is shown in FIG. 21. Moving time window 500 has a predetermined duration 502 and a predetermined dynamic range 504. In the example shown, the predetermined duration 502 is 200 ms. It is preferable that the predetermined duration be in a range of 100 ms to 300 ms. In the example shown, the predetermined dynamic range 504 corresponds to a difference between a minimum signal (data) 430 and the baseline signal (data) (426, 434). It is preferable to set the predetermined dynamic range to be a dynamic range of the PUT digital data (in this example, the PMUT digital data) under application of a standard force in a range of 0.5 N to 10 N at the sense region. The term "standard force" refers to a force that may be exerted during a standard touch event, such as touching by a finger of a typical person. Preferably, the dynamic range of the PMUT digital data would be known from a previous measurement, such as during step 278 (FIG. 15) of making an apparatus incorporating the force-measuring and touch-sensing IC device.

A moving time window can be applied to the negative-side high-pass filtered PMUT digital data. An illustrative moving time window 460, at a particular time, is shown in FIG. 21. Moving time window 460 has a predetermined duration 462 and a predetermined dynamic range 464. In the example shown, the predetermined duration 462 is 200 ms. It is preferable that the predetermined duration be in a range of 100 ms to 300 ms. In the example shown, the predetermined dynamic range 464 corresponds to a difference between a minimum signal (data) 446 and the baseline signal (data) (442, 450). It is preferable to set the predetermined dynamic range to be a dynamic range of the PUT digital data (in this example, the negative-side high-pass filtered PMUT digital data) under application of a standard force in a range of 0.5 N to 10 N at the sense region. Similarly, a moving time window (490) can be applied to the positive-side high-pass filtered PMUT digital data.

In the methods (algorithms) described hereinbelow with reference to FIGS. 24, 25, 26, 27, 28, 29, 30, and 31, a moving time window is applied to PUT digital data. Suitable PUT digital data include PMUT digital data before high-pass filtering (plot 420 of FIG. 21) and negative-side high-pass filtered PMUT digital signal (plot 440 of FIG. 21). Illustrative moving time windows are 460 and 500, respectively.

The moving time window can be applied to PMUT digital data that exhibit a decrease in signal in response to an object contacting the sense region.

Figure 22:
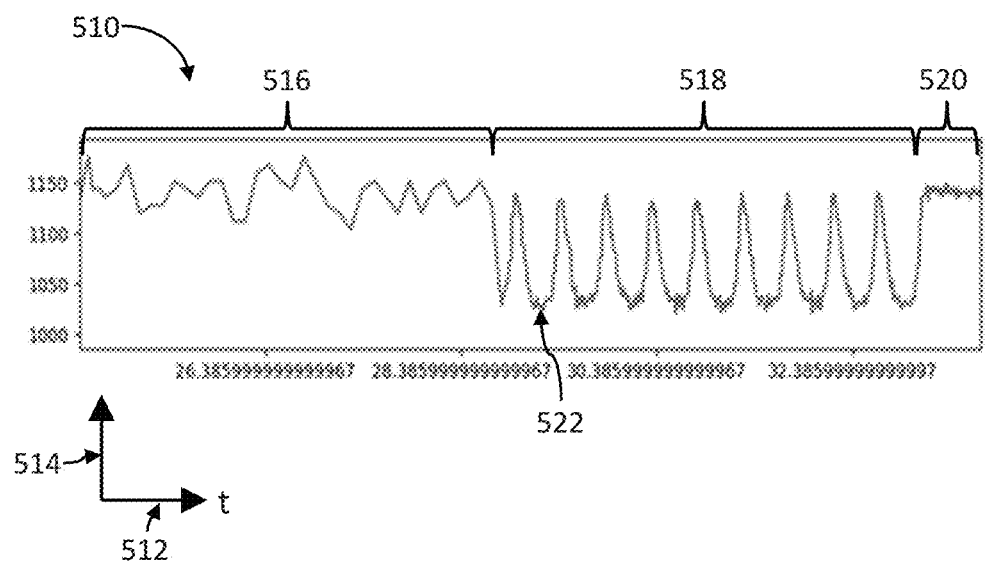
FIGS. 22 and 23 are diagrams showing graphical plots of PMUT digital data and PMFE digital data, respectively, in response to an example touch event.

FIG. 22 shows a graphical plot 510 of illustrative PMUT digital data during a repetitive touch event. Graphical plot 510 has a horizontal axis 512 showing time t, in which 1 division corresponds to 2.0 sec, and a vertical axis 514 showing PMUT digital data, after ADC and before high-pass filtering. Graphical plot 510 includes plot sections 516, 518, and 520 (ordered sequentially).

Graphical plot portions 516 and 520 correspond to time periods during which there is nothing touching or coming into contact with the sense region. These graphical plot sections 516 and 520 show the baseline signal. Plot section 518 corresponds to repetitive pressing of a digit (e.g., a finger) on the sense region, wherein each valley 522 in the PMUT signal corresponds to one occurrence of the digit pressing at the sense region. In the example shown, plot section 518 shows 10 repetitions of the digit pressing at the sense region. After each repetition, the digit is completely released (removed) from the sense region. As shown in FIG. 22, the 10 repetitions of the digit pressing at the sense region occur during a time period of approximately 4.1 sec. Accordingly, the repetition rate is approximately 2.4 Hz.

Figure 23:
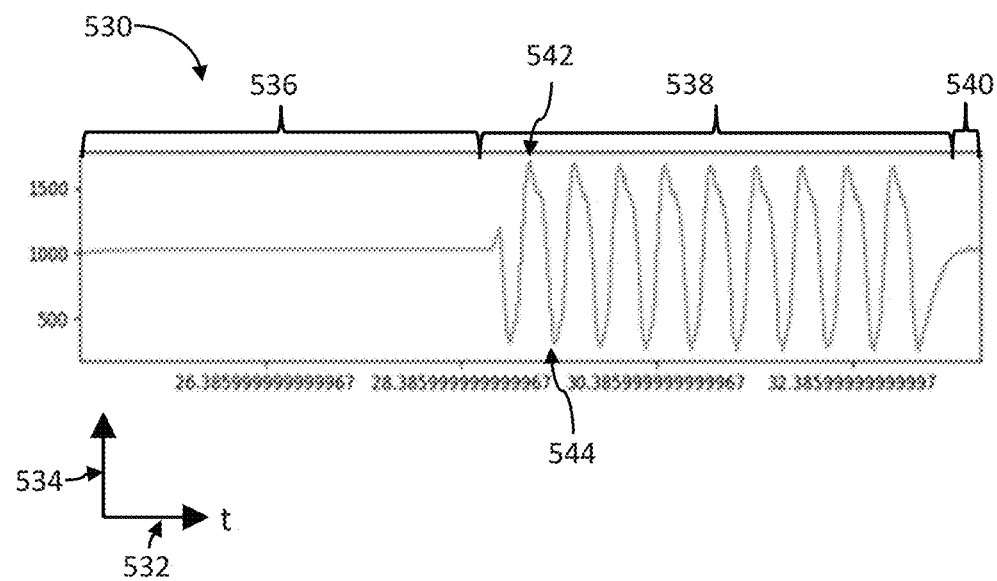

FIG. 23 shows a graphical plot 530 of illustrative PMFE digital data during the repetitive touch event shown in FIG. 22. Graphical plot 530 has a horizontal axis 532 showing time t, in which 1 division corresponds to 2.0 sec, and a vertical axis 534 showing PMFE digital data. Graphical plot 530 includes plot sections 536, 538, and 540 (ordered sequentially). Graphical plot portions 536 and 540 correspond to time periods during which there is nothing touching or coming into contact with the sense region. These graphical plot sections 536 and 540 show the baseline signal. Plot section 538 corresponds to repetitive pressing of a digit (e.g., a finger) on the sense region, analogous to plot section 518 of FIG. 22. There is a pair of maximum PMFE digital data 542 and a minimum PMFE digital data 544 (occurring after 542) corresponding to one repetition of a digit pressing at the sense region and the digit being removed from the sense region. As the digit presses the sense region, the PMFE(s) undergo a first deformation resulting in a first PMFE signal, and as the digit is removed from the sense region, the PMFE(s) undergo a second deformation resulting in a second PMFE signal. In this case, the first and second deformations are in opposite directions and the first and second PMFE signals are of opposite polarities relative to the baseline signal. As illustrated in the example of FIG. 11, the first deformation can be a first deflection during which a first deflection voltage $V_{d1}$ (corresponding to strain of a certain polarity and magnitude) is detectable. The second deformation can be a second deflection during which a second deflection voltage $V_{d2}$ (corresponding to strain of a certain polarity and magnitude) is detectable. As shown in FIG. 23, the 10 repetitions of the digit pressing at the sense region occur during a time period of approximately 4.1 sec. Accordingly, the repetition rate is approximately 2.4 Hz.

Figure 24:
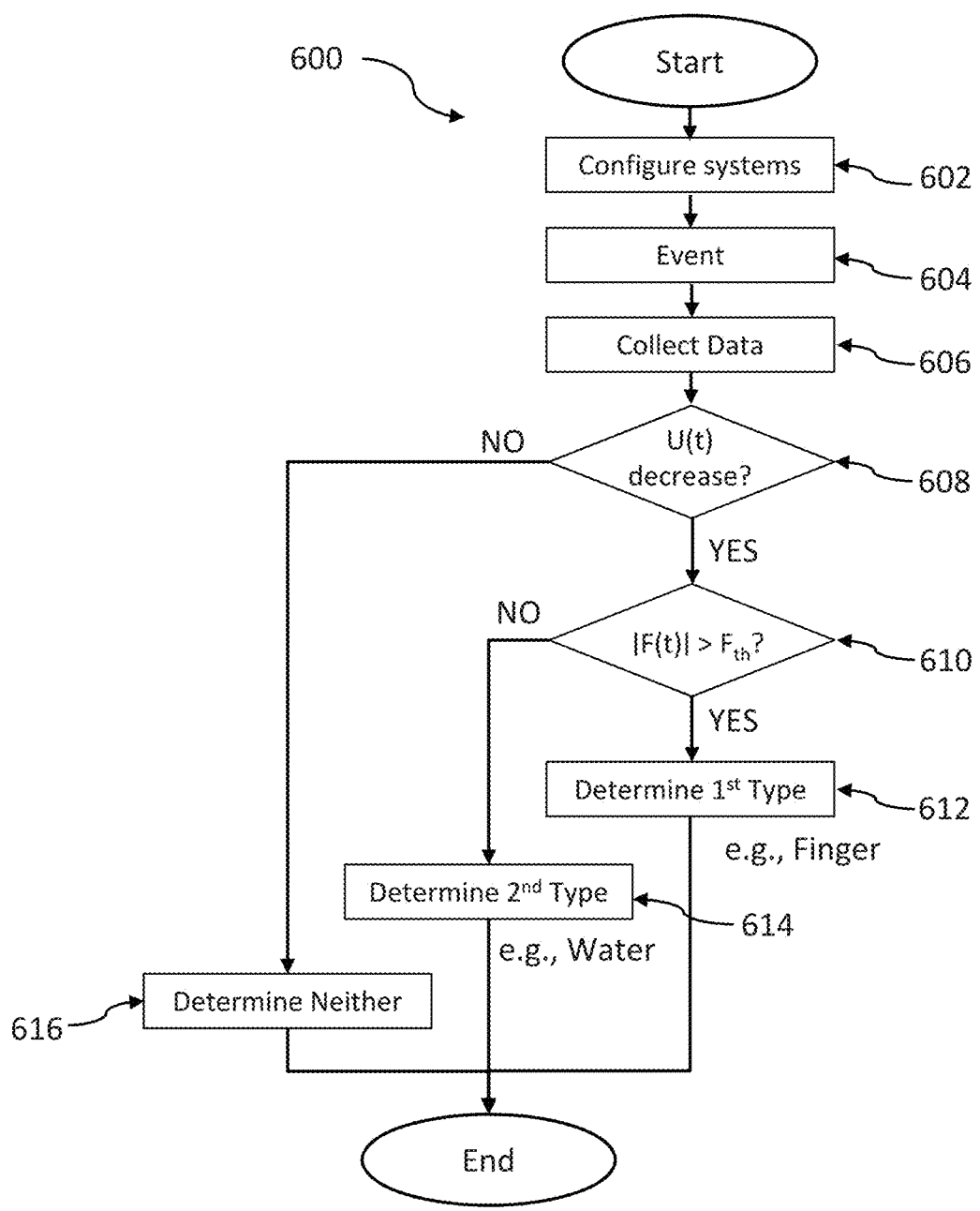
FIG. 24 is a flow diagram of a method of distinguishing between a first-type touch event and a second-type touch event at a sense region.

FIG. 24 is a flow diagram of a method 600 of distinguishing between a first-type touch event and a second-type touch event at a sense region. The method includes steps 602, 604, 606, 608, 610, 612, 614, and 616. At step 602, a force-measuring and touch-sensing system is configured at the sense region. The force-measuring and touch-sensing system includes at least one piezoelectric force-measuring element (PFE) and at least one piezoelectric ultrasonic transducer (PUT). Each PUT can be configured as a transmitter (PUT transmitter) and/or a receiver (PUT receiver) and the at least one PUT includes at least one PUT transmitter and at least one PUT receiver. Each PFE includes a piezoelectric capacitor and each PUT includes a piezoelectric capacitor. The PUTs can be piezoelectric micromechanical ultrasonic transducers (PMUTs). The PFEs can be piezoelectric micromechanical ultrasonic transducers (PMFEs). The PMUTs and the PMFEs can be located at different lateral positions along a piezoelectric layer such that each of the PMUTs and PMFEs include a respective portion of the piezoelectric layer. Possible configurations of force-measuring and touch-sensing systems are explained with reference to FIGS. 16, 17, 18, and 19. FIG. 1 shows an example of two force-measuring and touch-sensing IC devices configured at a sense region. The method 600 outlined in FIG. 24 can be applied to either one or both of the FMTSICs shown in FIG. 1. The configuring includes adhering a force-measuring and touch-sensing system to an interior surface of a cover layer. The sense region is a region of the exposed outer surface of the cover layer where the touch event occurs. The force-measuring and touch-sensing system is positioned such that it overlaps the sense region. The force-measuring and touch-sensing system is oriented such that ultrasound signals transmitted by the PUT transmitters propagate toward the sense region.

At step 604, an event occurs, which may include bringing an object into contact with the sense region. In an example of a first-type touch event, the object is a digit (e.g., a finger) and step 604 includes the digit touching the sense region. In an example of a second-type touch event of a second type, the object is a liquid droplet (e.g., rain drop) and step 604 includes the liquid droplet landing on the sense region. Generally, in a first-type or second-type touch event, an object touches the sense region. In a first-type touch event, the measured force generated by the event exceeds a noise threshold value. In a second-type touch event, the measured force generated by the event does not exceed the noise threshold value.

At step 606, ultrasound signals are transmitted by each PUT transmitter and voltage signals from the PUT receiver(s) and PFE(s) are read and processed. Each PUT transmitter transmits ultrasound signals of a first frequency $F_1$, in longitudinal mode(s) propagating along a direction approximately normal to a plane of the respective piezoelectric capacitor towards the sense region. The signal processing circuitry reads voltage signals from the PUT receiver(s) (PUT voltage signals) generated in response to ultrasound signals of the first frequency $F_1$ arriving at the PUT receivers from the sense region. The signal processing circuitry reads voltage signals from the PFE(s) (PFE voltage signals) generated in response to a low-frequency mechanical deformation of the respective piezoelectric capacitor. The signal processing circuitry can be implemented in multiple ICs or components. In the example shown in FIG. 17, the term "signal processing circuitry" refers to signal processing circuitry 316 (on touch-sensing IC device 310) and signal processing circuitry 326 (on force-measuring IC device 320) together. Additionally, at step 606, the PUT voltage signals are processed to obtain PUT digital data and the PFE voltage signals are processed to obtain PFE digital data. The PUT digital data can be PUT digital data before (without high-pass filtering) or negative-side high-pass filtered PUT digital data as explained by reference to FIG. 21. Step 606 includes: (a) transmitting of ultrasound signals by the PUT transmitters, (b) reading of voltage signals from the PUT receivers, and (c) reading of voltage signals from the PFEs. These actions (a), (b), and (c) of step 606 are carried out concurrently. Step 606 is carried out repeatedly. An event (step 604) may occur at some time while step 606 is being carried out.

At decision steps 608 and 610, certain questions are evaluated. At decision step 608, one of the following is selected: (1a) the PUT digital data U(t) decrease by at least the minimum decrease percentage of the predetermined dynamic range in the moving time window of the predetermined duration ("YES"); and (1b) the PUT digital data do not decrease by at least the minimum decrease percentage of the predetermined dynamic range in the moving time window of the predetermined duration ("NO"). As explained with reference to the example of FIG. 21, a moving time window can be applied the PMUT digital data before high-pass filtering or to negative-side high-pass filtered PMUT digital data. More generally, the moving time window can be applied to PUT digital data before high-pass filtering or to negative-side high-pass filtered PUT digital data. In the examples shown, the change of U(t) in the moving time window (460 or 500) is the difference in vertical axis values at point (466 or 506) (at the end of the respective time windows 460, 500) and point (468 or 508) (at the beginning of the respective time windows 460, 500). In the respective time window (460 or 500), the PUT digital data U(t) is decreasing. The minimum decrease percentage is set to be at least 1%, and preferably at least 2%, of the predetermined dynamic range.

At decision step 610, one of the following is selected: (2a) a magnitude of the PFE digital data is greater than a PFE noise threshold value ("YES"); and (2b) the magnitude of the PFE digital data is not greater than the PFE noise threshold value ("NO"). During second-type touch events (e.g., a liquid droplet landing on the sense region), little force is exerted at the sense region. Accordingly, the PFE noise threshold value is preferably set at five times a standard deviation of a noise level of the PFE digital data. For the purpose of carrying out step 610, as well as all other steps requiring PFE (e.g., PMFE) digital data in the methods of FIGS. 24, 25, 26, 27, 28, 29, and 30, only one set of PFEs (e.g., PMFEs) is needed. In the example shown in FIG. 14, each set of PMFEs (260, 262, 264, 266) includes two PMFEs connected in series. Alternatively, one PMFE set can consist of a single PMFE.

At step 612, the event is determined to be a first-type touch event if decision step 608 is YES and decision step 610 is YES. The event is determined to be of the first-type touch event if (1a) the PUT digital data decrease by at least a minimum decrease percentage of a predetermined dynamic range in a moving time window of a predetermined duration, and (2a) a magnitude of the PFE digital data is greater than a PFE noise threshold value. At step 614, the event is determined to be a second-type touch event if decision step 608 is YES and decision step 610 is NO. The event is determined to be a second-type touch event if (1a) the PUT digital data decrease by at least the minimum decrease percentage of the predetermined dynamic range in the moving time window of the predetermined duration, and (2b) the magnitude of the PFE digital data is not greater than the PFE noise threshold value. At step 616, the event is determined to be neither of the of the first type nor the second type if decision step 608 is NO. The touch event is determined to be neither the first-type touch event nor the second-type touch event if (1b) the PUT digital data do not decrease by at least the minimum decrease percentage of the predetermined dynamic range in the moving time window of the predetermined duration.

Figure 25:
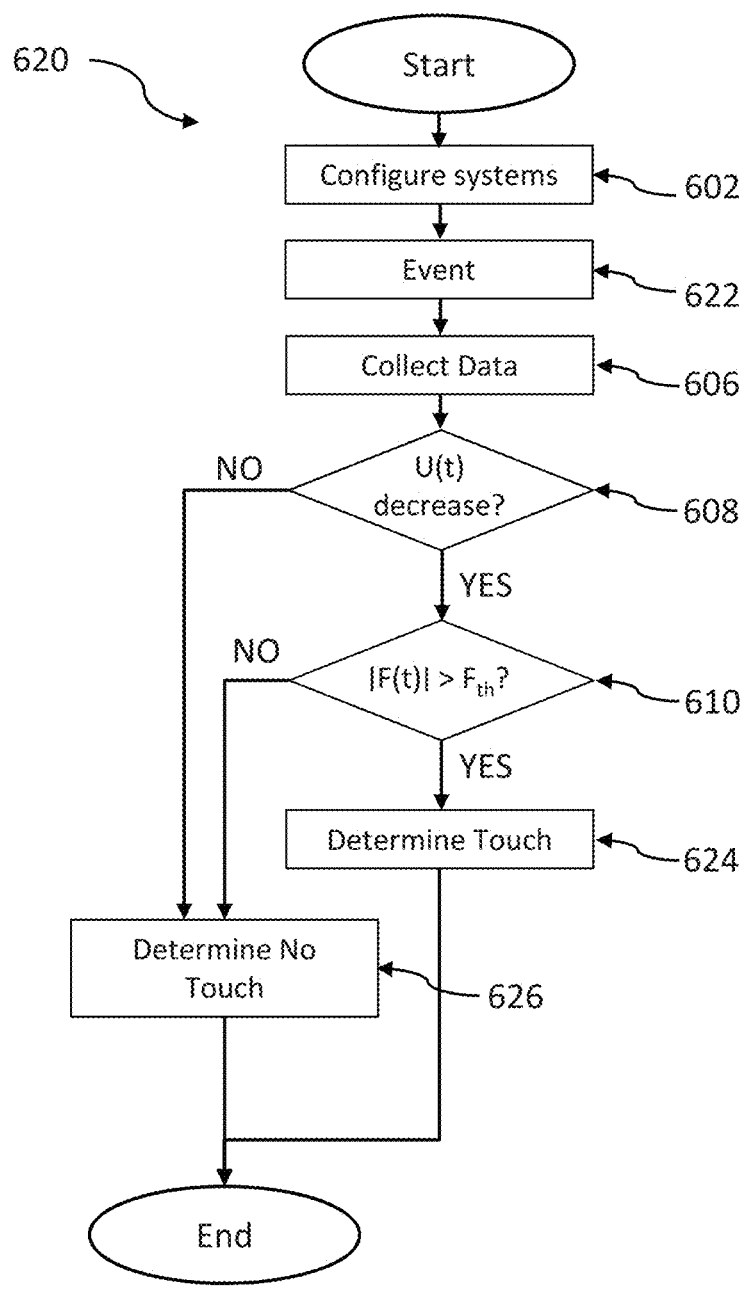
FIG. 25 is a flow diagram of a method of distinguishing between an actual-touch event and a non-touch event at a sense region.

FIG. 25 is a flow diagram of a method 620 of distinguishing between an actual-touch event (actual touch) and a non-touch event (non-touch) at a sense region. The method includes steps 602, 622, 606, 608, 610, 624, and 626. Steps 602, 606, 608, and 610 have been described with reference to FIG. 24. At step 622, an event occurs, which may include bringing an object into contact with the sense region. The event can be of an actual-touch event or a non-touch event. Method 620 can be used to determine whether there has been an actual touch at the sense region. An event (step 622) may occur at some time while step 606 is being carried out.

At step 624, a touch event is determined to be of an actual-touch event if decision step 608 is YES and decision step 610 is YES. The touch event is determined to be an actual-touch event if (1a) the PUT digital data decrease by at least a minimum decrease percentage of a predetermined dynamic range in a moving time window of a predetermined duration, and (2a) a magnitude of the PFE digital data is greater than a PFE noise threshold value. At step 626, the event is determined to be a non-touch event if decision step 608 is NO or decision step 610 is NO. The event is determined to be a non-touch event if (1b) the PUT digital data do not decrease by at least the minimum decrease percentage of the predetermined dynamic range in the moving time window of the predetermined duration, or (2b) the magnitude of the PFE digital data is not greater than the PFE noise threshold value. Preferably, the PFE noise threshold value is five times a standard deviation of a noise level of the PFE digital data.

Figure 26:
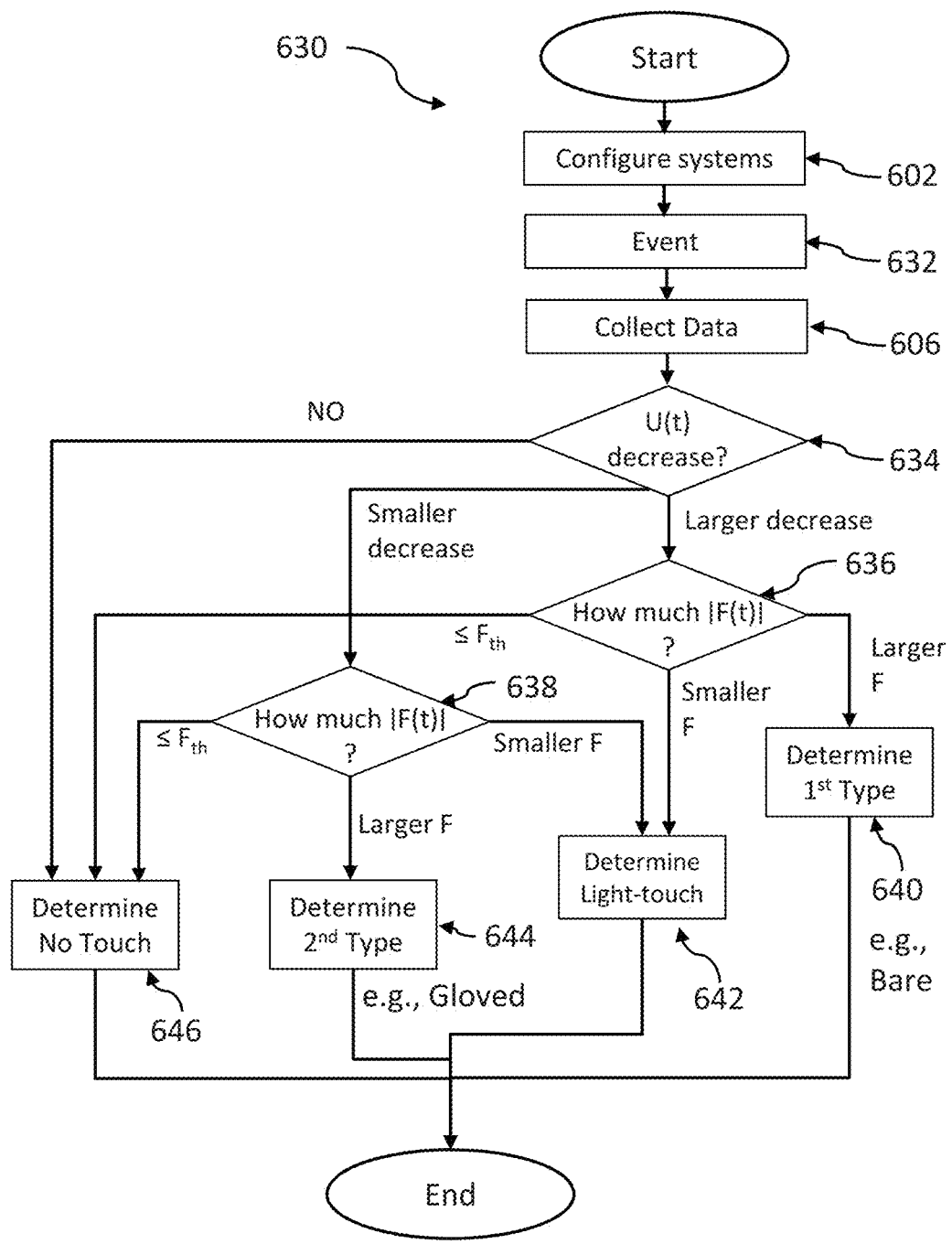
FIG. 26 is a flow diagram of a method of distinguishing among a first-type touch event, a second-type touch event, a light-touch event, and a non-touch event at a sense region.

FIG. 26 is a flow diagram of a method 630 of distinguishing among a first-type touch event, a second-type touch event, a light-touch event, and a non-touch event at a sense region. The method includes steps 602, 632, 606, 634, 636, 638, 640, 642, 644, and 646. Steps 602 and 606 have been described with reference to FIG. 24. At step 632, an event occurs, which may include bringing an object into contact with the sense region. The event can be a first-type touch event, a second-type touch event, a light-touch event, or a non-touch event. In an example of a first-type touch event, the object is a bare digit (e.g., a bare finger) and step 604 includes the bare digit touching the sense region. In an example of a second-type touch event, the object is a gloved digit (e.g., gloved finger) and step 604 includes the gloved digit touching the sense region. Method 630 is based on an observation that certain events (first-type touch events) result in greater decreases in PMUT digital signal than certain other events (second-type touch events). An event (step 632) may occur at some time while step 606 is being carried out.

At decision steps 634, 636, and 638, certain questions are evaluated. At decision step 634, one of the following three options is selected: (3a) the PUT digital data U(t) decrease by at least a first (larger) minimum decrease percentage of a predetermined dynamic range in a moving time window of a predetermined duration (referred to as "larger decrease" in FIG. 26); (3b) the PUT digital data U(t) decrease by at least a second (smaller) minimum decrease percentage and less than the first minimum decrease percentage of the predetermined dynamic range in the moving time window of the predetermined duration (referred to as "smaller decrease" in FIG. 26); and (3d) the PUT digital data U(t) do not decrease by at least the second minimum decrease percentage of the predetermined dynamic range in the moving time window of the predetermined duration (referred to as "NO" in FIG. 26). The second (smaller) minimum decrease percentage is set to be at least 1% of the predetermined dynamic range, and the first (larger) minimum decrease percentage is set to be at least 5 times the second (smaller) minimum decrease percentage. Preferably, the first (larger) minimum decrease percentage is at least 10%.

Decision steps 636 and 638 have the identical options but their inputs are coupled to the "larger decrease" and "smaller decrease" outputs of decision step 634, respectively. At decision step 636 and 638, one of the following three options is selected: (4a) a magnitude of the PFE digital data is greater than a PFE intermediate threshold value (referred to as "larger F" in FIG. 26); (4b) the magnitude of the PFE digital data is not greater than the PFE intermediate threshold value and greater than the PFE noise threshold value (referred to as "smaller F" in FIG. 26); and (4c) the magnitude of the PFE digital data is not greater than the PFE noise threshold value (referred to as $\leq F_{th}$ in FIG. 26). The PFE intermediate threshold value is greater than the PFE noise threshold value. Preferably, the PFE noise threshold value is five times a standard deviation of a noise level of the PFE digital data. Preferably, the PFE intermediate threshold value is a PFE digital data value corresponding to a physical force of 1.0 N applied at the sense region. Conversion of physical force values to PFE digital data values can be accomplished by use of PMFE test results acquired at step 278 (FIG. 14), for example.

At step 640, the event is determined to be a first-type touch event if decision step 634 is "Larger decrease" and decision step 636 is "Larger F". The event is determined to be of the first-type touch event if (3a) the PUT digital data decrease by at least a first minimum decrease percentage of a predetermined dynamic range in a moving time window of a predetermined duration, and (4a) a magnitude of the PFE digital data is greater than a PFE intermediate threshold value.

At step 644, the event is determined to be a second-type touch event if decision step 634 is "Smaller decrease" and decision step 636 is "Larger F". The event is determined to be the second-type touch event if (3b) the PUT digital data decrease by at least a second minimum decrease percentage and less than the first minimum decrease percentage of the predetermined dynamic range in the moving time window of the predetermined duration, and (4a) the magnitude of the PFE digital data is greater than the PFE intermediate threshold value.

At step 642, the event is determined to be a light-touch event, that is neither the first-type touch event nor the second-type touch event if decision step 634 is "Larger decrease" or "Smaller decrease" and decision step 636 is "Smaller F". The event is determined to be of a light-touch event if (3c) the PUT digital data decrease by at least the second minimum decrease percentage of the predetermined dynamic range in the moving time window of the predetermined duration, and (4b) the magnitude of the PFE digital data is not greater than the PFE intermediate threshold value and greater than the PFE noise threshold value.

At step 646, the touch event is determined to be a non-touch event if decision step 634 is NO or decision step 636 of 638 is $\leq F_{th}$. The event is determined to be a non-touch event if (3d) the PUT digital data do not decrease by at least the second minimum decrease percentage of the predetermined dynamic range in the moving time window of the predetermined duration, or (4c) the magnitude of the PFE digital data is not greater than the PFE noise threshold value.

Figure 27:
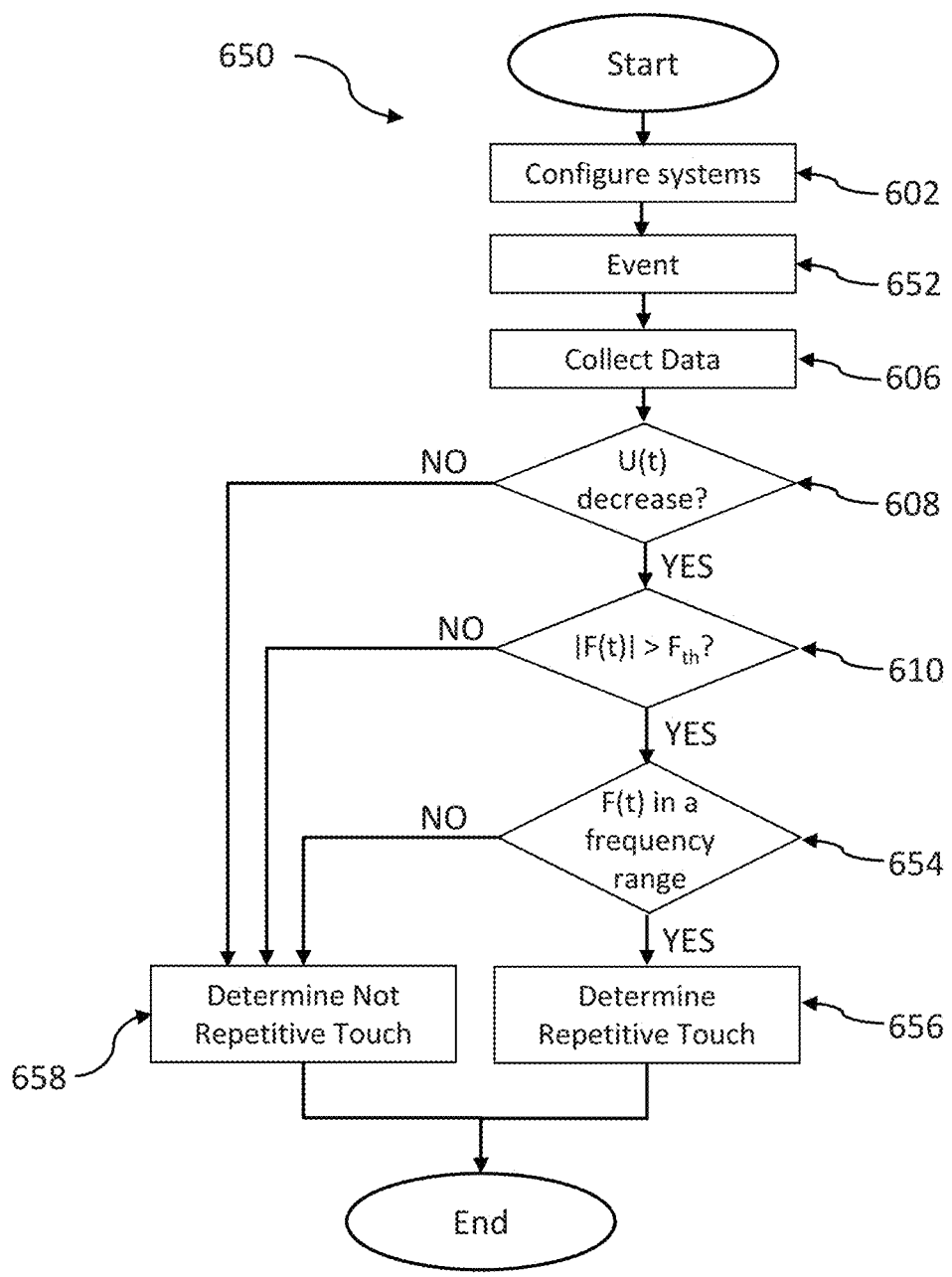
FIG. 27 is a flow diagram of a method of determining whether an event is a repetitive-touch event at a sense region.

FIG. 27 is a flow diagram of a method 650 of determining whether an event is a repetitive-touch event at a sense region. The method includes steps 602, 652, 606, 608, 610, 654, 656, and 658. Steps 602, 606, 608, and 610 have been described with reference to FIG. 24. At step 652, an event occurs, which may include bringing an object into contact with the sense region. The method 650 is useful for determining whether the event is one in which a digit (e.g., a finger) is repetitively touching the sense region. An event (step 652) may occur at some time while step 606 is being carried out. A repetitive touch by a human finger would result in PFE digital data to oscillate with a frequency in a range of 1 Hz to 10 Hz. In the example shown in FIG. 23, the PFE digital signal in plot section 518 oscillates with a frequency in a range of 2 Hz to 3 Hz.

At decision step 654, one of the following two options is selected: (5a) the PFE digital data oscillate with a frequency in a range of 1 Hz to 10 Hz ("YES"); and (5b) the PFE digital data do not oscillate with a frequency in a range of 1 Hz to 10 Hz ("NO").

At step 656, the event is determined to be a repetitive-touch event if decision step 608 is YES, decision step 610 is YES, and decision step 654 is YES. The event is determined to be of a repetitive-touch event if (1a) the PUT digital data decrease by at least a minimum decrease percentage of a predetermined dynamic range in a moving time window of a predetermined duration, and (5a) the PFE digital data oscillate with a frequency in a range of 1 Hz to 10 Hz. At step 658, the touch event is determined to be of not a repetitive-touch event if decision step 608 is NO or decision step 610 is NO or decision step 654 is NO. The event is determined to be of not a repetitive-touch event if (1b) the PUT digital data do not decrease by at least the minimum decrease percentage of the predetermined dynamic range in the moving time window of the predetermined duration, or (2b) the magnitude of the PFE digital data is not greater than the PFE noise threshold value, or (5b) the PFE digital data do not oscillate with a frequency in a range of 1 Hz to 10 Hz.

Figure 28:
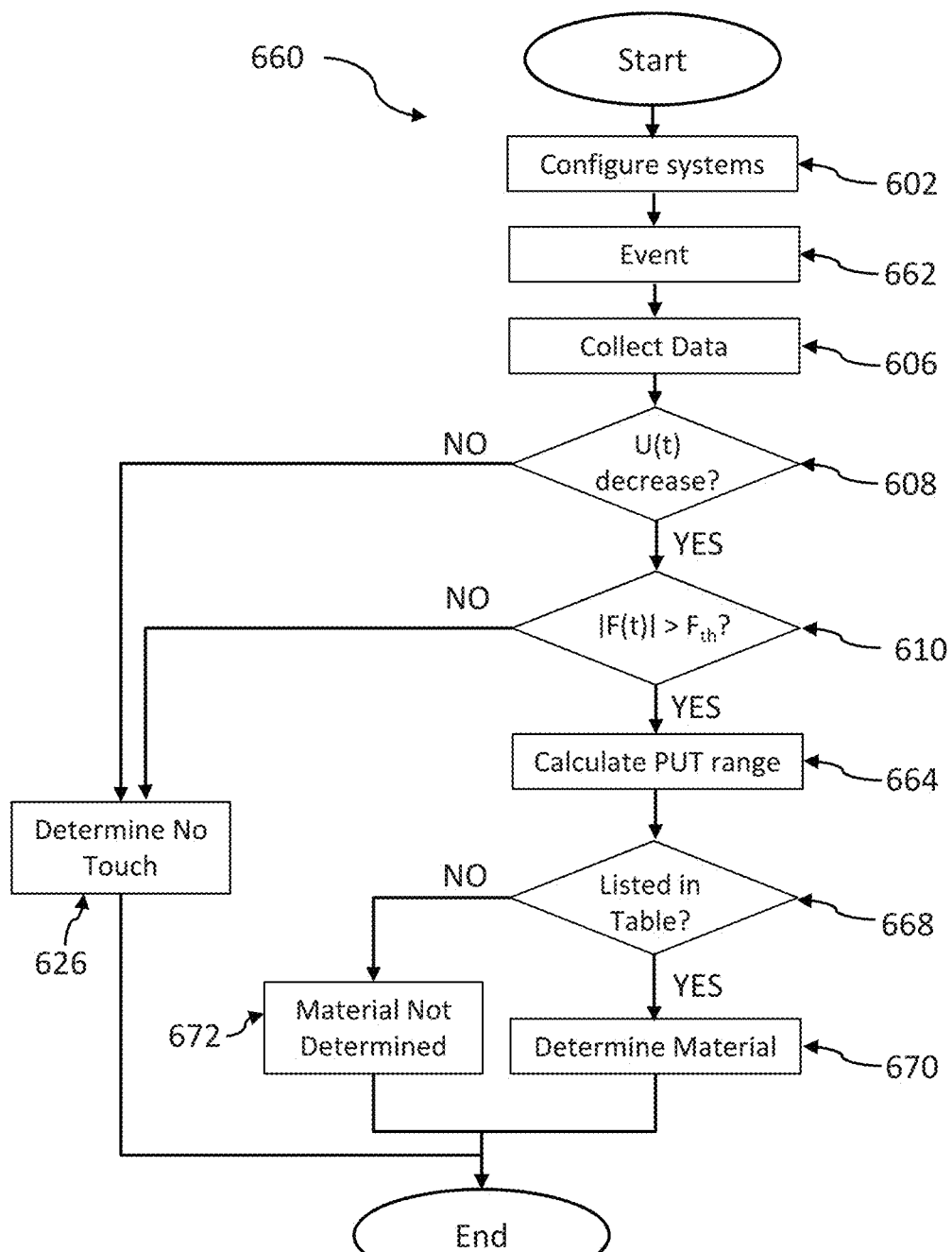
FIG. 28 is a flow diagram of a method of determining a material constituting an object contacting a sense region during an event.

FIG. 28 is a flow diagram of a method 660 of determining a material constituting an object contacting a sense region during a touch event. The method includes steps 602, 662, 606, 608, 610, 626, 664, 668, 670, and 672. Steps 602, 606, 608, and 610 have been described with reference to FIG. 24. An event (step 662) may occur at some time while step 606 is being carried out. At step 662, an event occurs, which includes bringing an object into contact with the sense region. At step 626, the event is determined to be of a non-touch event if decision step 608 is NO or decision step 610 is NO, as described with reference to FIG. 25. At step 664, a characteristic PUT decrement is calculated from the PUT digital data if decision step 608 is YES and decision step 610 is YES. At step 664, a characteristic PUT decrement is calculated from the PUT digital data if (1a) the PUT digital data decrease by at least the minimum decrease percentage of the predetermined dynamic range in the moving time window of the predetermined duration, and (2a) the magnitude of the PFE digital data is greater than the PFE noise threshold value.

In the example shown in FIG. 21, a graphical plot 420 shows the PMUT digital signal (before high-pass filter) and includes baseline signal portions (426, 434), a portion 428 during which the digital signal decreases from the baseline 426 towards the minimum signal portion 430, and a portion 432 during which the digital signal increases from the minimum signal portion 430 toward the baseline 434. The decreasing PMUT signal section 428 corresponds approximately to an object contacting the sense region and the increasing PMUT signal section 432 corresponds approximately to the object being released (removed) from the sense region. In the example of the graphical plot 420, the characteristic PMUT decrement is a difference (expressed in multiples of LSB) between the value at baseline 426 and the value at the minimum 430.

In the example shown in FIG. 21, a graphical plot 440 shows negative-side high-pass filtered PMUT digital signal and includes baseline signal portions (442, 450), a portion 444 during which the digital signal decreases from the baseline 442 towards the minimum signal portion 446, and a portion 448 during which the digital signal increases from the minimum signal portion 446 toward the baseline 450. In the example of the graphical plot 440, the characteristic PMUT decrement is a difference (expressed in multiples of LSB) between the value at baseline 442 and the value at the minimum 446. A characteristic PMUT decrement is calculated from one selected version of the PMUT digital signal (e.g., before high-pass filtering 420 or negative-side high-pass filtered 440).

At decision step 668, the characteristic PUT decrement is looked up in a look-up table such as Table 1 hereinbelow. Table 1 is an example of a look-up table and includes listed materials and a reference PMUT decrement range (expressed in LSB) associated with each of the listed materials. At decision step 668, the characteristic PUT decrement is looked up in a look-up table that includes listed materials and reference PUT decrement ranges associated with the listed materials to find one of the listed materials having an associated reference PUT decrement range corresponding to the characteristic PUT decrement.

A look-up table such as Table 1 can be prepared by testing each of the listed materials under predetermined conditions. A force-measuring and touch-sensing system (e.g., a force-measuring and touch-sensing IC device also referred to as FMTSIC device) is configured at the sense region, as explained with reference to step 602. The configuring includes adhering a force-measuring and touch-sensing system (e.g., the FMTSIC device) to an interior surface of a cover layer. The testing is carried out for a particular implementation of the cover layer (e.g., material, thickness). In the example shown in Table 1, the cover layer selected to be a conformable material (i.e., rubber). Each listed material, fashioned into an object of suitable shape and size, is brought into contact with the sense region under a range of forces. Since each listed material has different acoustic impedance characteristics, each object, fashioned from the respective listed material, has a different effect on the PUT signal when contacting the sense region. PUT decrement values are calculated from the resulting PUT digital data obtained under a range of forces, for each listed material. These PUT decrement values are stored in the look-up table as a range of reference PUT decrement values (PUT decrement range). In an example shown in Table 1, a plastic object was brought into contact with the sense region under a range of forces, and the PMUT decrement values were determined to be in a range of 770 to 800 LSB.

TABLE 1

| Reference PMUT Decrement Range (LSB): | Listed Materials: |
|---|---|
| 50-80 | Steel |
| 150-180 | Aluminum |
| 200-230 | Glass |
| 460-490 | Cloth |
| 560-750 | Hardwood |
| 770-800 | Plastic |
| 800-1000 | Rubber |

For example, suppose that as a result of a touch event, a characteristic PMUT decrement value of 780 is calculated at step 664. At step 668, we look up the characteristic PMUT decrement value of 780 in Table 1 to find a reference PMUT decrement range of 770-800, which corresponds to the characteristic PMUT decrement.

At step 670, if one of the listed materials is found to have associated reference PUT decrement range corresponding to the characteristic PUT decrement, then the one of the listed materials is determined to be the material constituting the object. For example, if plastic is found to have associated reference PMUT decrement range (770-800) corresponding to the characteristic PMUT decrement (780), then plastic is determined to be the material constituting the object. At step 672, if none of the listed materials is found to have associated reference PUT ranges corresponding to the characteristic PUT decrement, then it is determined that the material constituting the object has not been determined.

Figure 29:
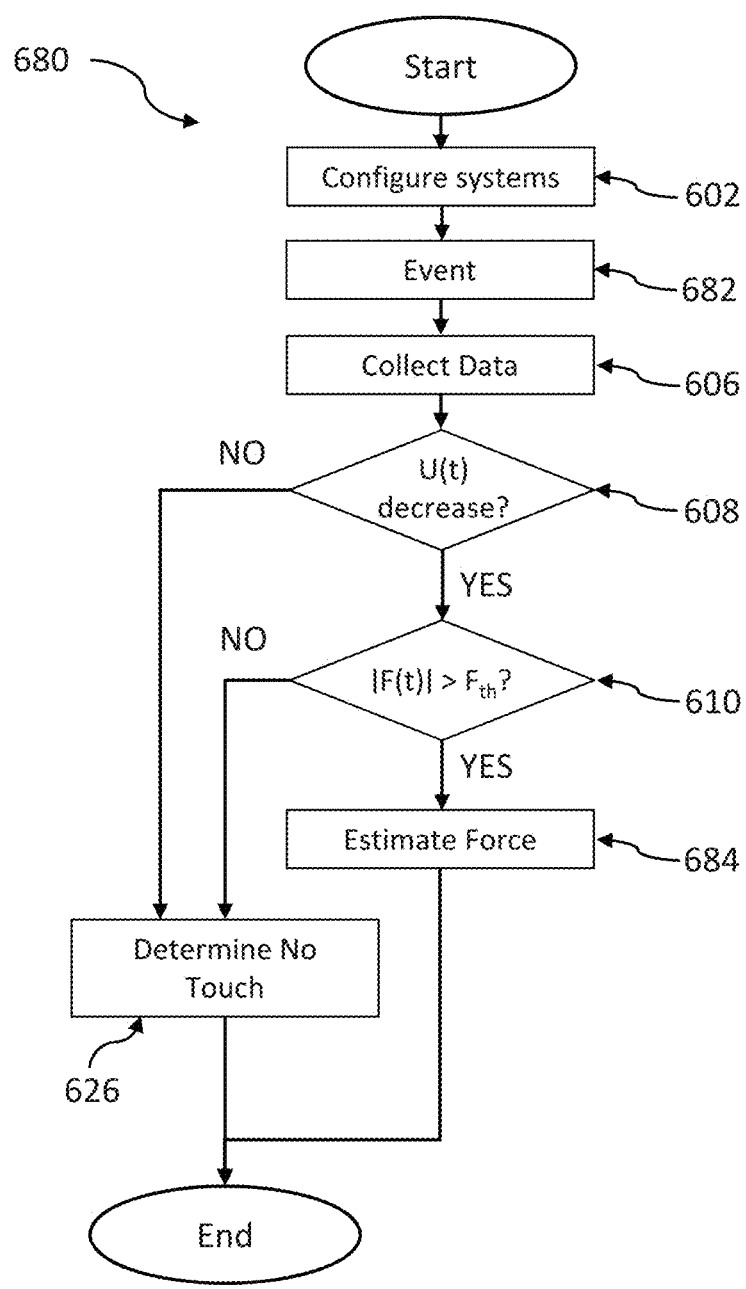
FIG. 29 is a flow diagram of a method of estimating an applied force during an event at a sense region.

FIG. 29 is a flow diagram of a method 680 of estimating an applied force during a touch event at a sense region. The method includes steps 602, 682, 606, 608, 610, 684, and 626. Steps 602, 606, 608, and 610 have been described with reference to FIG. 24. An event (step 682) may occur at some time while step 606 is being carried out. At step 682, an event occurs, which may include bringing an object into contact with the sense region. At step 626, the event is determined to be of a non-touch event if decision step 608 is NO or decision step 610 is NO, as described with reference to FIG. 25.

At step 684, a value of the applied force is estimated from a magnitude of the PFE digital data if (1a) the PUT digital data decrease by at least a minimum decrease percentage of a predetermined dynamic range in a moving time window of a predetermined duration, and (2a) the magnitude of the PFE digital data is greater than a PFE noise threshold value. Step 684 includes converting the magnitude of the PFE digital data to a physical force value. The conversion of the magnitude of the PFE digital data to a physical force value can be carried out by using a previously obtained conversion ratio such as one or both of the following: (1) a ratio A of a magnitude of the PFE digital data to a physical force value; and/or (2) a ratio B of a physical force value to a magnitude of the PFE digital data.

Figure 30:
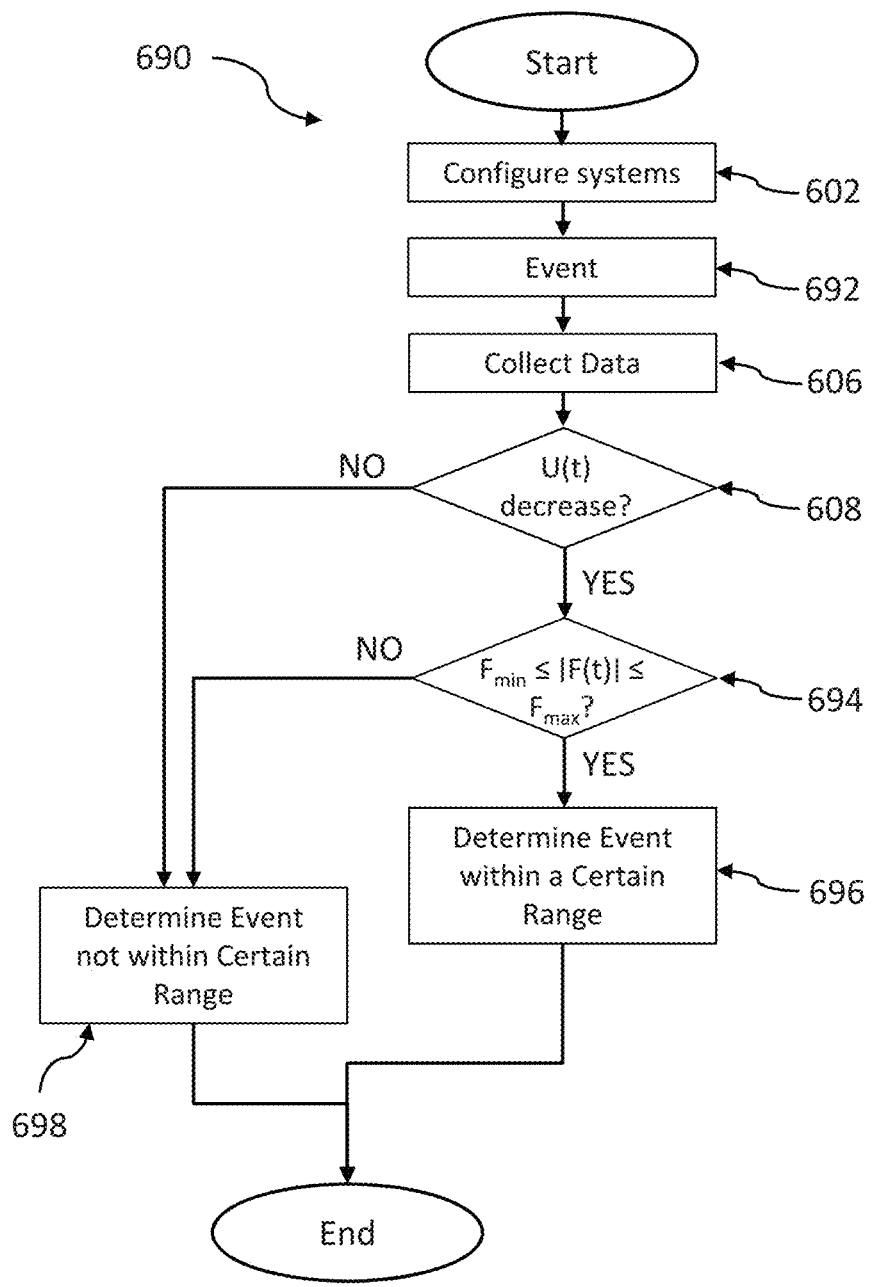
FIG. 30 is a flow diagram of a method of determining whether an event at a sense region is within a predetermined range of force.

FIG. 30 is a flow diagram of a method 690 of determining whether an event at a sense region is within a predetermined range of force. The method includes steps 602, 692, 606, 608, 694, 696, and 698. Steps 602, 606, and 608 have been described with reference to FIG. 24. An event (step 692) may occur at some time while step 606 is being carried out. At step 692, an event occurs, which may include bringing an object into contact with the sense region.

At decision step 694, one of the following is selected: (5a) a magnitude of the PFE digital data is within the predetermined range of force; and (5b) the magnitude of the PFE digital data is not within the predetermined range of force. The predetermined range of force can be expressed as a predetermined range of physical force values or a predetermined range of PFE digital data magnitudes. Accordingly, it may be necessary to convert between the magnitude of the PFE digital data and a physical force value using a previously obtained conversion ratio such as one or both of the following: (1) a ratio A of a magnitude of the PFE digital data to a physical force value; and/or (2) a ratio B of a physical force value to a magnitude of the PFE digital data. At step 696, an event is determined to be within a predetermined range of force if (1a) the PUT digital data decrease by at least a minimum decrease percentage of a predetermined dynamic range in a moving time window of a predetermined duration, and (5a) a magnitude of the PFE digital data is within the predetermined range of force. At step 698, the event is determined to be not within the predetermined range of force if (1b) the PUT digital data do not decrease by at least the minimum decrease percentage of the predetermined dynamic range in the moving time window of the predetermined duration, or (5b) the magnitude of the PFE digital data is not within the predetermined range of force.

FIGS. 24, 25, 26, 27, 28, 29, and 30 illustrated cases in which a method (algorithm) is carried out using PUT (e.g., PMUT) transmitters and receivers operating at a first frequency $F_1$. However, in order to reduce the effect of temperature-induced drift, it may be preferable to operate the PUT transmitters and PUT receivers at two different frequencies $F_1$ and $F_2$. The methods 600, 620, 630, 650, 660, 680, and 690 can be extended such that the PUT transmitters and PUT receivers operate at two different frequencies $F_1$ and $F_2$. For example, at step 606, each PUT transmitter can transmit ultrasound signals of a first frequency $F_1$ or a second frequency $F_2$. The signal processing circuitry reads voltage signals from the PUT receiver(s) generated in response to ultrasound signals of the first frequency $F_1$ or of the second frequency $F_2$ arriving at the PUT receivers from the sense region. For example, at decision step 608, one of the following can be selected: (1a) the PUT digital data U(t) for both frequencies decrease by at least the minimum decrease percentage of the predetermined dynamic range in the moving time window of the predetermined duration ("YES"); and (1b) the PUT digital data for one or both of the frequencies do not decrease by at least the minimum decrease percentage of the predetermined dynamic range in the moving time window of the predetermined duration ("NO").

Figure 31:
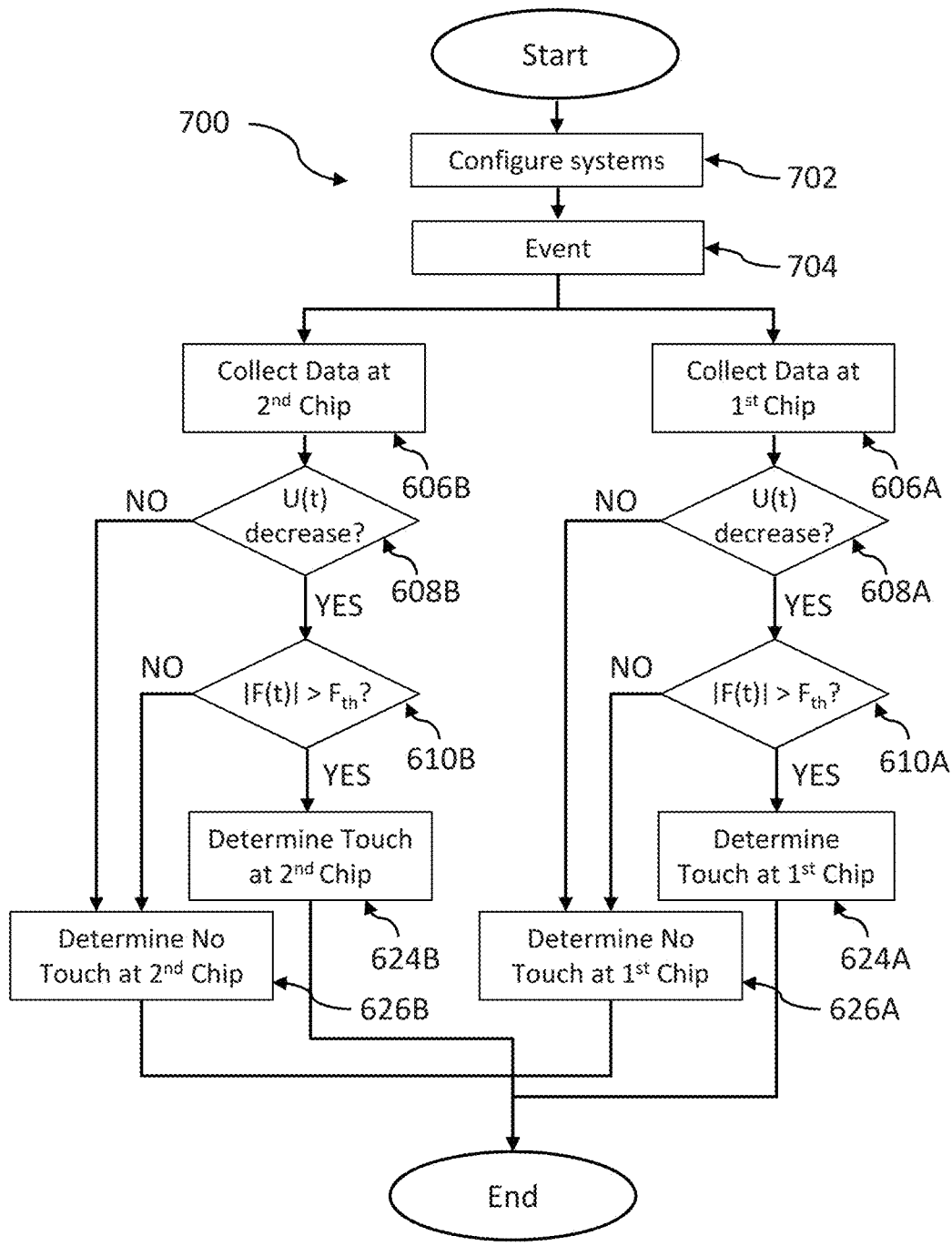
FIG. 31 is a flow diagram of a method of distinguishing between actual-touch and non-touch events at a first FMTSIC and a second FMTSIC.

FIGS. 24, 25, 26, 27, 28, 29, and 30 illustrated cases in which a method (algorithm) is carried out using a single force-measuring and touch-sensing system (FIG. 16, 17, 18, or 19). As shown in FIG. 1, configurations containing two (or more) FMTSICs (102, 106) are possible. Any of the foregoing methods can be implemented with two or more force-measuring and touch-sensing systems. FIG. 31 shows a case in which two FMTSIC devices are configured at a sense region, in which each of the FMTSICs carry out a method of distinguishing between an actual-touch event and a non-touch event at a sense region, analogous to method 620 of FIG. 25. Accordingly, method 700 of FIG. 31 distinguishes among a touch event in the vicinity of a first FMTSIC device or the vicinity of a second FMTSIC device or in the vicinity of both FMTSIC devices. FIG. 31 is a flow diagram of a method 700 of distinguishing, by each of two force-measuring and touch-sensing systems, between a an actual-touch event and a non-touch event at a sense region. The method 700 includes steps 702, 704, 606(A, B), 608(A, B), 610(A,B), 624(A,B), and 626(A,B), where A and B refer to the first and second FMTSIC devices, respectively. Steps 702, 704, 606(A,B), 608(A,B), 610(A,B), 624(A,B), and 626(A,B) are analogous to steps 602, 604, 606, 608, 610, 624, and 626 of FIG. 25, respectively. According to method 700, each of the two FMTSIC devices is able to distinguish between touch events without relying upon data from the other of the FMTSIC devices.

What is claimed is:

1. A method of distinguishing between a first-type touch event and a second-type touch event at a sense region, comprising the steps of:

(A) configuring a force-measuring and touch-sensing system at the sense region, the system comprising:
 at least one piezoelectric force-measuring element (PFE), each PFE comprising a piezoelectric capacitor; and
 at least one piezoelectric ultrasonic transducer (PUT), each PUT comprising a piezoelectric capacitor;
 wherein each PUT can be configured as a transmitter (PUT transmitter) and/or a receiver (PUT receiver) and the at least one PUT includes at least one PUT transmitter and at least one PUT receiver;
(B) transmitting, by each PUT transmitter, ultrasound signals of a first frequency $F_1$, in longitudinal mode(s) propagating along a direction approximately normal to a plane of the respective piezoelectric capacitor towards the sense region;
(C) reading, by a signal processing circuitry, voltage signals from the PUT receiver(s) (PUT voltage signals) generated in response to ultrasound signals of the first frequency $F_1$ arriving at the PUT receivers from the sense region;
(D) reading, by the signal processing circuitry, voltage signals from the PFE(s) (PFE voltage signals) generated in response to a low-frequency mechanical deformation of the respective piezoelectric capacitor;
(E) processing the PUT voltage signals to obtain PUT digital data;
(F) processing the PFE voltage signals to obtain PFE digital data;
(G) determining that an event is a first-type touch event if (1a) the PUT digital data decrease by at least a minimum decrease percentage of a predetermined dynamic range in a moving time window of a predetermined duration, and (2a) a magnitude of the PFE digital data is greater than a PFE noise threshold value;
(H) determining that the event is a second-type touch event if (1a) the PUT digital data decrease by at least the minimum decrease percentage of the predetermined dynamic range in the moving time window of the predetermined duration, and (2b) the magnitude of the PFE digital data is not greater than the PFE noise threshold value; and
(I) determining that the event is of neither the first-type touch event nor the second-type touch event if (1b) the PUT digital data do not decrease by at least the minimum decrease percentage of the predetermined dynamic range in the moving time window of the predetermined duration;
wherein the first-type touch event comprises a first object contacting the sense region and the second-type touch event comprises a second object contacting the sense region;
wherein the steps of (B) transmitting ultrasound signals, (C) reading of voltage signals from the PUT receiver(s), and (D) reading of voltage signals from the PFE(s) are carried out concurrently; and
wherein the minimum decrease percentage is at least 1% and the predetermined duration is in a range of 100 ms to 300 ms.

2. The method of claim 1, wherein the first object is a digit and the first object contacting the sense region comprises the digit touching the sense region.

3. The method of claim 1, wherein the second object is a liquid droplet, and the second object contacting the sense region comprises the liquid droplet landing on the sense region.

4. The method of claim 1, wherein the piezoelectric ultrasonic transducers (PUTs) are piezoelectric micromechanical ultrasonic transducers (PMUTs).

5. The method of claim 1, wherein the piezoelectric force-measuring elements (PFEs) are piezoelectric micromechanical ultrasonic transducers (PMFEs).

6. The method of claim 1, wherein a closest distance between the at least one PFE and the at least one PUT is 5 mm or less.

7. The method of claim 1, wherein:
the piezoelectric ultrasonic transducers (PUTs) are piezoelectric micromechanical ultrasonic transducers (PMUTs);
the piezoelectric force-measuring elements (PFEs) are piezoelectric micromechanical ultrasonic transducers (PMFEs); and
the PMUTs and PMFEs are located at different lateral positions along a piezoelectric layer, each of the PMUTs and PMFEs comprising a respective portion of the piezoelectric layer.

8. The method of claim 1, wherein the minimum decrease percentage is at least 2%.

9. The method of claim 1, wherein the PFE noise threshold value is five times a standard deviation of a noise level of the PFE digital data.

10. The method of claim 1, wherein the predetermined dynamic range is a dynamic range of the PUT digital data under application of a standard force in a range of 0.5 N to 10 N at the sense region.

11. A method of distinguishing between an actual-touch event and of a non-touch event at a sense region, comprising the steps of:
(A) configuring a force-measuring and touch-sensing system at the sense region, the system comprising:
at least one piezoelectric force-measuring element (PFE), each PFE comprising a piezoelectric capacitor; and
at least one piezoelectric ultrasonic transducer (PUT), each PUT comprising a piezoelectric capacitor;
wherein each PUT can be configured as a transmitter (PUT transmitter) and/or a receiver (PUT receiver) and the at least one PUT includes at least one PUT transmitter and at least one PUT receiver;
(B) transmitting, by each PUT transmitter, ultrasound signals of a first frequency $F_1$, in longitudinal mode(s) propagating along a direction approximately normal to a plane of the respective piezoelectric capacitor towards the sense region;
(C) reading, by a signal processing circuitry, voltage signals from the PUT receiver(s) (PUT voltage signals) generated in response to ultrasound signals of the first frequency $F_1$ arriving at the PUT receivers from the sense region;
(D) reading, by the signal processing circuitry, voltage signals from the PFE(s) (PFE voltage signals) generated in response to a low-frequency mechanical deformation of the respective piezoelectric capacitor;
(E) processing the PUT voltage signals to obtain PUT digital data;
(F) processing the PFE voltage signals to obtain PFE digital data;
(G) determining that an event is an actual-touch event if (1a) the PUT digital data decrease by at least a minimum decrease percentage of a predetermined dynamic range in a moving time window of a predetermined duration, and (2a) a magnitude of the PFE digital data is greater than a PFE noise threshold value; and
(H) determining that the event is a non-touch event if (1b) the PUT digital data do not decrease by at least the minimum decrease percentage of the predetermined dynamic range in the moving time window of the predetermined duration, or (2b) the magnitude of the PFE digital data is not greater than the PFE noise threshold value;
wherein the steps of (B) transmitting ultrasound signals, (C) reading of voltage signals from the PUT receiver(s), and (D) reading of voltage signals from the PFE(s) are carried out concurrently; and
wherein the minimum decrease percentage is at least 1% and the predetermined duration is in a range of 100 ms to 300 ms.

12. The method of claim 11, wherein the piezoelectric ultrasonic transducers (PUTs) are piezoelectric micromechanical ultrasonic transducers (PMUTs).

13. The method of claim 11, wherein the piezoelectric force-measuring elements (PFEs) are piezoelectric micromechanical ultrasonic transducers (PMFEs).

14. The method of claim 11, wherein a closest distance between the at least one PFE and the at least one PUT is 5 mm or less.

15. The method of claim 11, wherein:
the piezoelectric ultrasonic transducers (PUTs) are piezoelectric micromechanical ultrasonic transducers (PMUTs);
the piezoelectric force-measuring elements (PFEs) are piezoelectric micromechanical ultrasonic transducers (PMFEs); and
the PMUTs and PMFEs are located at different lateral positions along a piezoelectric layer, each of the PMUTs and PMFEs comprising a respective portion of the piezoelectric layer.

16. The method of claim 11, wherein the minimum decrease percentage is at least 2%.

17. The method of claim 11, wherein the PFE noise threshold value is five times a standard deviation of a noise level of the PFE digital data.

18. The method of claim 11, wherein the predetermined dynamic range is a dynamic range of the PUT digital data under application of a standard force in a range of 0.5 N to 10 N at the sense region.

19. A method of distinguishing among a first-type touch event, a second-type touch event, a light-touch event, and a non-touch event at a sense region, comprising the steps of: (A) configuring a force-measuring and touch-sensing system at the sense region, the system comprising: at least one piezoelectric force-measuring element (PFE), each PFE comprising a piezoelectric capacitor; and at least one piezoelectric ultrasonic transducer (PUT), each PUT comprising a piezoelectric capacitor; wherein each PUT can be configured as a transmitter (PUT transmitter) and/or a receiver (PUT receiver) and the at least one PUT includes at least one PUT transmitter and at least one PUT receiver; (B) transmitting, by each PUT transmitter, ultrasound signals of a first frequency Fi, in longitudinal mode(s) propagating along a direction approximately normal to a plane of the respective piezoelectric capacitor towards the sense region; (C) reading, by a signal processing circuitry, voltage signals from the PUT receiver(s) (PUT voltage signals) generated in response to ultrasound signals of the first frequency Ti arriving at the PUT receivers from the sense region; (D) reading, by the signal processing circuitry, voltage signals from the PFE(s) (PFE voltage signals) generated in response to a low-frequency mechanical deformation of the respective piezoelectric capacitor; (E) processing the PUT voltage signals to obtain PUT digital data; (F) processing the PFE voltage signals to obtain PFE digital data; (G) determining that an event is a first-type touch event if (3a) the PUT digital data decrease by at least a first minimum decrease percentage of a predetermined dynamic range in a moving time window of a predetermined duration, and (4a) a magnitude of the PFE digital data is greater than a PFE intermediate threshold value; (H) determining that the event is a second-type touch event if (3b) the PUT digital data decrease by at least a second minimum decrease percentage and less than the first minimum decrease percentage of the predetermined dynamic range in the moving time window of the predetermined duration, and (4a) the magnitude of the PFE digital data is greater than the PFE intermediate threshold value; (I) determining that the event is a light-touch event that is neither the first-type touch event nor the second-type touch event if (3c) the PUT digital data decrease by at least the second minimum decrease percentage of the predetermined dynamic range in the moving time window of the predetermined duration, and (4b) the magnitude of the PFE digital data is not greater than the PFE intermediate threshold value and greater than a PFE noise threshold value; and (J) determining that the event is a non-touch event if (3d) the PUT digital data do not decrease by at least the second minimum decrease percentage of the predetermined dynamic range in the moving time window of the predetermined duration, or (4c) the magnitude of the PFE digital data is not greater than the PFE noise threshold value; and wherein the first-type touch event comprises a first object contacting the sense region and the second-type touch event comprises a second object contacting the sense region; wherein the steps of (B) transmitting ultrasound signals, (C) reading of voltage signals from the PUT receiver(s), and (D) reading of voltage signals from the PFE(s) are carried out concurrently; and wherein the second minimum decrease percentage is at least 100, the first minimum decrease percentage is at least 5 times the second minimum decrease percentage, and the predetermined duration is in a range of 100 ms to 300 ms; and wherein the PFE intermediate threshold value is greater than the PFE noise threshold value.

20. The method of claim 19, wherein the first minimum decrease percentage is at least 10%.

21. The method of claim 19, wherein the first object is a bare digit, and the first object contacting the sense region comprises the bare digit touching the sense region.

22. The method of claim 19, wherein the second object is a gloved digit and the second object contacting the sense region comprises the gloved digit touching the sense region.

23. The method of claim 19, wherein the piezoelectric ultrasonic transducers (PUTs) are piezoelectric micromechanical ultrasonic transducers (PMUTs).

24. The method of claim 19, wherein the piezoelectric force-measuring elements (PFEs) are piezoelectric micromechanical ultrasonic transducers (PMFEs).

25. The method of claim 19, wherein a closest distance between the at least one PFE and the at least one PUT is 5 mm or less.

26. The method of claim 19, wherein:
the piezoelectric ultrasonic transducers (PUTs) are piezoelectric micromechanical ultrasonic transducers (PMUTs);
the piezoelectric force-measuring elements (PFEs) are piezoelectric micromechanical ultrasonic transducers (PMFEs); and the PMUTs and PMFEs are located at different lateral positions along a piezoelectric layer, each of the PMUTs and PMFEs comprising a respective portion of the piezoelectric layer.

27. The method of claim 19, wherein the PFE noise threshold value is five times a standard deviation of a noise level of the PFE digital data.

28. The method of claim 19, wherein the predetermined dynamic range is a dynamic range of the PUT digital data under application of a standard force in a range of 0.5 N to 10 N at the sense region.

29. The method of claim 19, wherein the PFE intermediate threshold value a PMFE digital data value corresponding to a physical force of 1.0 N applied at the sense region.

30. A method of determining whether an event is a repetitive-touch event at a sense region, comprising the steps of:
(A) configuring a force-measuring and touch-sensing system at the sense region, the system comprising:
at least one piezoelectric force-measuring element (PFE), each PFE comprising a piezoelectric capacitor; and
at least one piezoelectric ultrasonic transducer (PUT), each PUT comprising a piezoelectric capacitor;
wherein each PUT can be configured as a transmitter (PUT transmitter) and/or a receiver (PUT receiver) and the at least one PUT includes at least one PUT transmitter and at least one PUT receiver;
(B) transmitting, by each PUT transmitter, ultrasound signals of a first frequency $F_1$, in longitudinal mode(s) propagating along a direction approximately normal to a plane of the respective piezoelectric capacitor towards the sense region;
(C) reading, by a signal processing circuitry, voltage signals from the PUT receiver(s) (PUT voltage signals) generated in response to ultrasound signals of the first frequency $F_1$ arriving at the PUT receivers from the sense region;
(D) reading, by the signal processing circuitry, voltage signals from the PFE(s) (PFE voltage signals) generated in response to a low-frequency mechanical deformation of the respective piezoelectric capacitor;
(E) processing the PUT voltage signals to obtain PUT digital data;
(F) processing the PFE voltage signals to obtain PFE digital data;
(G) determining that an event is a repetitive-touch event if (1a) the PUT digital data decrease by at least a minimum decrease percentage of a predetermined dynamic range in a moving time window of a predetermined duration, and (2a) a magnitude of the PFE digital data is greater than a PFE noise threshold value, and (5a) the PFE digital data oscillate with a frequency in a range of 1 Hz to 10 Hz; and
(H) determining that the event is not a repetitive-touch event if (1b) the PUT digital data do not decrease by at least the minimum decrease percentage of the predetermined dynamic range in the moving time window of the predetermined duration, or (2b) the magnitude of the PFE digital data is not greater than the PFE noise threshold value, or (5b) the PFE digital data do not oscillate with a frequency in a range of 1 Hz to 10 Hz;
wherein the steps of (B) transmitting ultrasound signals, (C) reading of voltage signals from the PUT receiver(s), and (D) reading of voltage signals from the PFE(s) are carried out concurrently; and wherein the minimum decrease percentage is at least 1% and the predetermined duration is in a range of 100 ms to 300 ms.

31. The method of claim 30, wherein the piezoelectric ultrasonic transducers (PUTs) are piezoelectric micromechanical ultrasonic transducers (PMUTs).

32. The method of claim 30, wherein the piezoelectric force-measuring elements (PFEs) are piezoelectric micromechanical ultrasonic transducers (PMFEs).

33. The method of claim 30, wherein a closest distance between the at least one PFE and the at least one PUT is 5 mm or less.

34. The method of claim 30, wherein:
the piezoelectric ultrasonic transducers (PUTs) are piezoelectric micromechanical ultrasonic transducers (PMUTs);
the piezoelectric force-measuring elements (PFEs) are piezoelectric micromechanical ultrasonic transducers (PMFEs); and
the PMUTs and PMFEs are located at different lateral positions along a piezoelectric layer, each of the PMUTs and PMFEs comprising a respective portion of the piezoelectric layer.

35. The method of claim 30, wherein the minimum decrease percentage is at least 2%.

36. The method of claim 30, wherein the PFE noise threshold value is five times a standard deviation of a noise level of the PFE digital data.

37. The method of claim 30, wherein the predetermined dynamic range is a dynamic range of the PUT digital data under application of a standard force in a range of 0.5 N to 10 N at the sense region.

38. A method of determining a material constituting an object contacting a sense region during an event, comprising the steps of:
(A) configuring a force-measuring and touch-sensing system at the sense region, the system comprising:
at least one piezoelectric force-measuring element (PFE), each PFE comprising a piezoelectric capacitor; and
at least one piezoelectric ultrasonic transducer (PUT), each PUT comprising a piezoelectric capacitor;
wherein each PUT can be configured as a transmitter (PUT transmitter) and/or a receiver (PUT receiver) and the at least one PUT includes at least one PUT transmitter and at least one PUT receiver;
(B) transmitting, by each PUT transmitter, ultrasound signals of a first frequency $F_1$, in longitudinal mode(s) propagating along a direction approximately normal to a plane of the respective piezoelectric capacitor towards the sense region;
(C) reading, by a signal processing circuitry, voltage signals from the PUT receiver(s) (PUT voltage signals) generated in response to ultrasound signals of the first frequency $F_1$ arriving at the PUT receivers from the sense region;
(D) reading, by the signal processing circuitry, voltage signals from the PFE(s) (PFE voltage signals) generated in response to a low-frequency mechanical deformation of the respective piezoelectric capacitor;
(E) processing the PUT voltage signals to obtain PUT digital data;
(F) processing the PFE voltage signals to obtain PFE digital data;
(G) determining that an event is a non-touch event if (1b) the PUT digital data do not decrease by at least a minimum decrease percentage of a predetermined dynamic range in a moving time window of a predetermined duration, or (2b) a magnitude of the PFE digital data is not greater than a PFE noise threshold value;
(H) calculating a characteristic PUT decrement from the PUT digital data if (1a) the PUT digital data decrease by at least the minimum decrease percentage of the predetermined dynamic range in the moving time window of the predetermined duration, and (2a) the magnitude of the PFE digital data is greater than the PFE noise threshold value;
(I) looking up the characteristic PUT decrement in a look-up table comprising listed materials and reference PUT decrement ranges associated with the listed materials to find one of the listed materials having an associated reference PUT decrement range corresponding to the characteristic PUT decrement;
(J) if one of the listed materials is found to have associated reference PUT ranges corresponding to the characteristic PUT decrement, then determining that the one of the listed materials is the material constituting the object; and
(K) if none of the listed materials is found to have associated reference PUT ranges corresponding to the characteristic PUT decrement, then determining that the material constituting the object has not been determined;
wherein the steps of (B) transmitting ultrasound signals, (C) reading of voltage signals from the PUT receiver(s), and (D) reading of voltage signals from the PFE(s) are carried out concurrently; and
wherein the minimum decrease percentage is at least 1% and the predetermined duration is in a range of 100 ms to 300 ms.

39. The method of claim 38, wherein the piezoelectric ultrasonic transducers (PUTs) are piezoelectric micromechanical ultrasonic transducers (PMUTs).

40. The method of claim 38, wherein the piezoelectric force-measuring elements (PFEs) are piezoelectric micromechanical ultrasonic transducers (PMFEs).

41. The method of claim 38, wherein a closest distance between the at least one PFE and the at least one PUT is 5 mm or less.

42. The method of claim 38, wherein:
the piezoelectric ultrasonic transducers (PUTs) are piezoelectric micromechanical ultrasonic transducers (PMUTs);
the piezoelectric force-measuring elements (PFEs) are piezoelectric micromechanical ultrasonic transducers (PMFEs); and
the PMUTs and PMFEs are located at different lateral positions along a piezoelectric layer, each of the PMUTs and PMFEs comprising a respective portion of the piezoelectric layer.

43. The method of claim 38, wherein the minimum decrease percentage is at least 2%.

44. The method of claim 38, wherein the PFE noise threshold value is five times a standard deviation of a noise level of the PFE digital data.

45. The method of claim 38, wherein the predetermined dynamic range is a dynamic range of the PUT digital data under application of a standard force in a range of 0.5 N to 10 N at the sense region.

46. A method of estimating an applied force during an event at a sense region, comprising the steps of:
(A) configuring a force-measuring and touch-sensing system at the sense region, the system comprising:

at least one piezoelectric force-measuring element (PFE), each PFE comprising a piezoelectric capacitor; and at least one piezoelectric ultrasonic transducer (PUT), each PUT comprising a piezoelectric capacitor;

wherein each PUT can be configured as a transmitter (PUT transmitter) and/or a receiver (PUT receiver) and the at least one PUT includes at least one PUT transmitter and at least one PUT receiver;

(B) transmitting, by each PUT transmitter, ultrasound signals of a first frequency $F_1$, in longitudinal mode(s) propagating along a direction approximately normal to a plane of the respective piezoelectric capacitor towards the sense region;

(C) reading, by a signal processing circuitry, voltage signals from the PUT receiver(s) (PUT voltage signals) generated in response to ultrasound signals of the first frequency $F_1$ arriving at the PUT receivers from the sense region;

(D) reading, by the signal processing circuitry, voltage signals from the PFE(s) (PFE voltage signals) generated in response to a low-frequency mechanical deformation of the respective piezoelectric capacitor;

(E) processing the PUT voltage signals to obtain PUT digital data;

(F) processing the PFE voltage signals to obtain PFE digital data;

(G) estimating a value of the applied force from a magnitude of the PFE digital data if (1a) the PUT digital data decrease by at least a minimum decrease percentage of a predetermined dynamic range in a moving time window of a predetermined duration, and (2a) the magnitude of the PFE digital data is greater than a PFE noise threshold value; and (H) determining that the event is a non-touch event if (1b) the PUT digital data do not decrease by at least the minimum decrease percentage of the predetermined dynamic range in the moving time window of the predetermined duration, or (2b) the magnitude of the PFE digital data is not greater than the PFE noise threshold value;

wherein the steps of (B) transmitting ultrasound signals, (C) reading of voltage signals from the PUT receiver(s), and (D) reading of voltage signals from the PFE(s) are carried out concurrently; and wherein the minimum decrease percentage is at least 1% and the predetermined duration is in a range of 100 ms to 300 ms.

47. The method of claim 46, wherein the piezoelectric ultrasonic transducers (PUTs) are piezoelectric micromechanical ultrasonic transducers (PMUTs).

48. The method of claim 46, wherein the piezoelectric force-measuring elements (PFEs) are piezoelectric micromechanical ultrasonic transducers (PMFEs).

49. The method of claim 46, wherein a closest distance between the at least one PFE and the at least one PUT is 5 mm or less.

50. The method of claim 46, wherein:
the piezoelectric ultrasonic transducers (PUTs) are piezoelectric micromechanical ultrasonic transducers (PMUTs);
the piezoelectric force-measuring elements (PFEs) are piezoelectric micromechanical ultrasonic transducers (PMFEs); and the PMUTs and PMFEs are located at different lateral positions along a piezoelectric layer, each of the PMUTs and PMFEs comprising a respective portion of the piezoelectric layer.

51. The method of claim 46, wherein the minimum decrease percentage is at least 2%.

52. The method of claim 46, wherein the PFE noise threshold value is five times a standard deviation of a noise level of the PFE digital data.

53. The method of claim 46, wherein the predetermined dynamic range is a dynamic range of the PUT digital data under application of a standard force in a range of 0.5 N to 10 N at the sense region.

54. A method of determining whether an event at a sense region is within a predetermined range of force, comprising the steps of:

(A) configuring a force-measuring and touch-sensing system at the sense region, the system comprising:
at least one piezoelectric force-measuring element (PFE), each PFE comprising a piezoelectric capacitor; and at least one piezoelectric ultrasonic transducer (PUT), each PUT comprising a piezoelectric capacitor;

wherein each PUT can be configured as a transmitter (PUT transmitter) and/or a receiver (PUT receiver) and the at least one PUT includes at least one PUT transmitter and at least one PUT receiver;

(B) transmitting, by each PUT transmitter, ultrasound signals of a first frequency $F_1$, in longitudinal mode(s) propagating along a direction approximately normal to a plane of the respective piezoelectric capacitor towards the sense region;

(C) reading, by a signal processing circuitry, voltage signals from the PUT receiver(s) (PUT voltage signals) generated in response to ultrasound signals of the first frequency $F_1$ arriving at the PUT receivers from the sense region;

(D) reading, by the signal processing circuitry, voltage signals from the PFE(s) (PFE voltage signals) generated in response to a low-frequency mechanical deformation of the respective piezoelectric capacitor;

(E) processing the PUT voltage signals to obtain PUT digital data;

(F) processing the PFE voltage signals to obtain PFE digital data;

(G) determining that the event is within a predetermined range of force if (1a) the PUT digital data decrease by at least a minimum decrease percentage of a predetermined dynamic range in a moving time window of a predetermined duration, and (5a) a magnitude of the PFE digital data is within the predetermined range of force; and (I) determining that the event is within the predetermined range of force if (b) the PUT digital data do not decrease by at least the minimum decrease percentage of the predetermined dynamic range in the moving time window of the predetermined duration, or (5b) the magnitude of the PFE digital data is not within the predetermined range of force;

wherein the steps of (B) transmitting ultrasound signals, (C) reading of voltage signals from the PUT receiver(s), and (D) reading of voltage signals from the PFE(s) are carried out concurrently; and wherein the minimum decrease percentage is at least 1% and the predetermined duration is in a range of 100 ms to 300 ms.

55. The method of claim 54, wherein the piezoelectric ultrasonic transducers (PUTs) are piezoelectric micromechanical ultrasonic transducers (PMUTs).

56. The method of claim 54, wherein the piezoelectric force-measuring elements (PFEs) are piezoelectric micromechanical ultrasonic transducers (PMFEs).

57. The method of claim 54, wherein a closest distance between the at least one PFE and the at least one PUT is 5 mm or less.

58. The method of claim 54, wherein:
 the piezoelectric ultrasonic transducers (PUTs) are piezoelectric micromechanical ultrasonic transducers (PMUTs);
 the piezoelectric force-measuring elements (PFEs) are piezoelectric micromechanical ultrasonic transducers (PMFEs); and
 the PMUTs and PMFEs are located at different lateral positions along a piezoelectric layer, each of the PMUTs and PMFEs comprising a respective portion of the piezoelectric layer.

59. The method of claim 54, wherein the minimum decrease percentage is at least 2%.

60. The method of claim 54, wherein the PFE noise threshold value is five times a standard deviation of a noise level of the PFE digital data.

61. The method of claim 54, wherein the predetermined dynamic range is a dynamic range of the PUT digital data under application of a standard force in a range of 0.5 N to 10 N at the sense region.

* * * * *